(12) United States Patent
Jeaurond

(10) Patent No.: US 11,879,568 B2
(45) Date of Patent: Jan. 23, 2024

(54) PIPELINE-LEAK-CONTAINMENT APPARATUS

(71) Applicant: CANADIAN PRESSURE CONTROL INC., Red Deer (CA)

(72) Inventor: Gilles Jeaurond, Red Deer (CA)

(73) Assignee: CANADIAN PRESSURE CONTROL INC.

( * ) Notice: Subject to any disclaimer, the term of this patent is extended or adjusted under 35 U.S.C. 154(b) by 372 days.

(21) Appl. No.: 17/420,519

(22) PCT Filed: Jan. 3, 2020

(86) PCT No.: PCT/CA2020/050007
§ 371 (c)(1),
(2) Date: Jul. 2, 2021

(87) PCT Pub. No.: WO2020/140157
PCT Pub. Date: Jul. 9, 2020

(65) Prior Publication Data
US 2022/0090724 A1    Mar. 24, 2022

Related U.S. Application Data

(60) Provisional application No. 62/788,515, filed on Jan. 4, 2019.

(51) Int. Cl.
*F16L 55/17* (2006.01)
*F17D 5/04* (2006.01)

(52) U.S. Cl.
CPC .............. *F16L 55/17* (2013.01); *F17D 5/04* (2013.01); *F16L 2201/30* (2013.01)

(58) Field of Classification Search
CPC ......... G01M 3/283; F16L 9/18; F16L 55/168; F16L 2201/30; F16L 55/17; F17D 5/04
(Continued)

(56) References Cited

U.S. PATENT DOCUMENTS 3,882,382 A    5/1975  Johnson
3,907,336 A *  9/1975  Siegmund ................ F16L 9/18
                                              138/104
(Continued)

FOREIGN PATENT DOCUMENTS

AU      1510095 B     7/1995
CN    101208257 A     6/2008
(Continued)

OTHER PUBLICATIONS

International Search Report and Written Opinion of the International Searching Authority for International Application No. PCT/CA2020/050007 dated Mar. 23, 2020.

*Primary Examiner* — Patrick F Brinson
(74) *Attorney, Agent, or Firm* — George S. Blasiak; Heslin Rothenberg Farley & Mesiti P.C.

(57) ABSTRACT

Pipelines in operation specifically the ones operating under high pressures are subject to structural deficiencies therefore, they are susceptible to leakage. The present disclosure relates to a pipeline-leak-containment apparatus comprising an elongate tubular containment wall and at least a first clamp and a second clamp sealingly engaging a section of a pipe to form a sealed interstitial space between the elongate tubular containment wall and the pipe. The tubular containment wall comprises an inner layer, a reinforcement layer and an outer layer. Each clamp comprises an inner clamp, and an outer clamp, wherein at least the inner layer at each end of the elongate tubular containment wall is sealingly sandwiched between the inner clamp and the outer clamp of each clamp. Inner and outer clamps are split clamps that sealingly engage the pipe upon tightening of fastening members.

23 Claims, 9 Drawing Sheets

(58) Field of Classification Search
USPC .............. 138/97, 99, 104, 109; 73/49.1
See application file for complete search history.

(56) References Cited

U.S. PATENT DOCUMENTS

| | | | |
|---|---|---|---|
| 4,120,285 A | 10/1978 | Nugent | |
| 4,165,765 A | 8/1979 | Gilbu et al. | |
| 4,259,993 A | 4/1981 | Scholz | |
| 4,410,013 A | 10/1983 | Sasaki et al. | |
| 4,468,609 A | 8/1984 | Schmitz | |
| 4,483,670 A | 11/1984 | Yamamoto et al. | |
| 4,523,454 A | 6/1985 | Sharp | |
| 4,653,312 A | 3/1987 | Sharp | |
| 4,696,186 A | 9/1987 | Sharp | |
| 4,759,994 A | 7/1988 | Lesourd | |
| 4,821,915 A | 4/1989 | Mayer | |
| 4,871,078 A | 10/1989 | Sharp | |
| 4,915,121 A | 4/1990 | Rains | |
| 5,072,622 A | 12/1991 | Roach et al. | |
| 5,165,453 A | 11/1992 | Walker, Jr. | |
| 5,167,352 A | 12/1992 | Robbins | |
| 5,176,025 A | 1/1993 | Butts | |
| 5,187,366 A | 2/1993 | Hopenfeld | |
| 5,222,769 A | 6/1993 | Kaempen | |
| 5,297,896 A | 3/1994 | Webb | |
| 5,343,738 A | 9/1994 | Skaggs | |
| 5,427,474 A | 6/1995 | Silvers | |
| 5,546,992 A | 8/1996 | Chick et al. | |
| 5,654,499 A | 8/1997 | Manuli | |
| 5,713,392 A | 2/1998 | O'Rourke | |
| 5,810,040 A | 9/1998 | Ludwig | |
| 5,918,267 A | 6/1999 | Evans et al. | |
| 5,931,198 A | 8/1999 | Raji et al. | |
| 5,971,029 A | 10/1999 | Smith et al. | |
| 5,975,110 A | 11/1999 | Sharp | |
| 6,026,862 A | 2/2000 | Friedrich et al. | |
| 6,032,699 A | 3/2000 | Cochran et al. | |
| 6,202,376 B1 | 3/2001 | Guiton | |
| 6,247,499 B1 | 6/2001 | Lauzon | |
| 6,489,894 B2 | 12/2002 | Berg | |
| 6,511,232 B1 | 1/2003 | Ishii et al. | |
| 6,527,015 B2 | 3/2003 | Lively | |
| 6,581,644 B1 | 6/2003 | Monette et al. | |
| 6,601,600 B1 * | 8/2003 | Taylor ................ | G05D 21/00 137/15.04 |
| 6,688,338 B2 | 2/2004 | Meli et al. | |
| 6,935,160 B2 | 8/2005 | Hong et al. | |
| 7,011,102 B2 | 3/2006 | Folkers | |
| 7,051,579 B2 | 5/2006 | Kenney et al. | |
| 7,334,456 B2 | 2/2008 | Kenney et al. | |
| 7,348,047 B2 | 3/2008 | Snell et al. | |
| 7,367,362 B2 | 5/2008 | Rice et al. | |
| 7,387,012 B2 | 6/2008 | Spaolonzi et al. | |
| 7,453,367 B2 | 11/2008 | Spaolonzi et al. | |
| 7,500,489 B2 | 3/2009 | Folkers | |
| 7,509,841 B2 | 3/2009 | Spaolonzi et al. | |
| 7,900,655 B2 | 3/2011 | Morton et al. | |
| 8,631,829 B1 * | 1/2014 | Bennett ................ | B29C 66/532 138/104 |
| 8,758,539 B2 | 6/2014 | Venero et al. | |
| 8,871,306 B2 | 10/2014 | Niccolls et al. | |
| 9,027,605 B2 | 5/2015 | Williams | |
| RE45,673 E | 9/2015 | Russell | |
| 9,249,905 B2 | 2/2016 | Mezzalira | |
| 9,310,014 B2 | 4/2016 | Ekelund et al. | |
| 9,841,344 B2 | 12/2017 | Rabb et al. | |
| 11,255,358 B1 * | 2/2022 | Srock ................ | F28D 7/106 |
| 2005/0166666 A1 * | 8/2005 | Tsukagoshi ........ | G01M 3/283 73/49.1 |
| 2005/0169710 A1 | 8/2005 | Folkers | |
| 2005/0252277 A1 | 11/2005 | Kenney et al. | |
| 2006/0093791 A1 | 5/2006 | Snell et al. | |
| 2007/0113971 A1 | 5/2007 | Driver et al. | |
| 2007/0157705 A1 | 7/2007 | Bilstad et al. | |
| 2007/0184226 A1 | 8/2007 | Winzeler | |
| 2010/0237606 A1 | 9/2010 | Lazzara et al. | |
| 2011/0259589 A1 * | 10/2011 | Rosen ................ | B23C 3/00 166/55 |
| 2011/0284115 A1 | 11/2011 | Venero et al. | |
| 2013/0087238 A1 | 4/2013 | Mercier | |
| 2014/0000742 A1 * | 1/2014 | Betsinger ............ | G01N 27/20 138/36 |
| 2014/0251638 A1 | 9/2014 | Pinarello et al. | |
| 2016/0010779 A1 | 1/2016 | Warren | |
| 2020/0309634 A1 * | 10/2020 | Patel ................ | F28F 9/0246 |

FOREIGN PATENT DOCUMENTS

| | | | | |
|---|---|---|---|---|
| CN | 204009177 U | | 12/2014 | |
| EP | 0607173 A1 | | 7/1994 | |
| EP | 0960296 A2 | | 12/1999 | |
| EP | 1082209 A1 | | 3/2001 | |
| EP | 3572706 A1 * | | 11/2019 | ........... C21C 5/4673 |
| GB | 994578 | | 6/1965 | |
| KR | 200423965 Y1 | | 8/2006 | |
| RU | 2006129816 A | | 2/2008 | |
| WO | 9609487 A3 | | 3/1996 | |
| WO | 2006012131 A3 | | 2/2006 | |

* cited by examiner

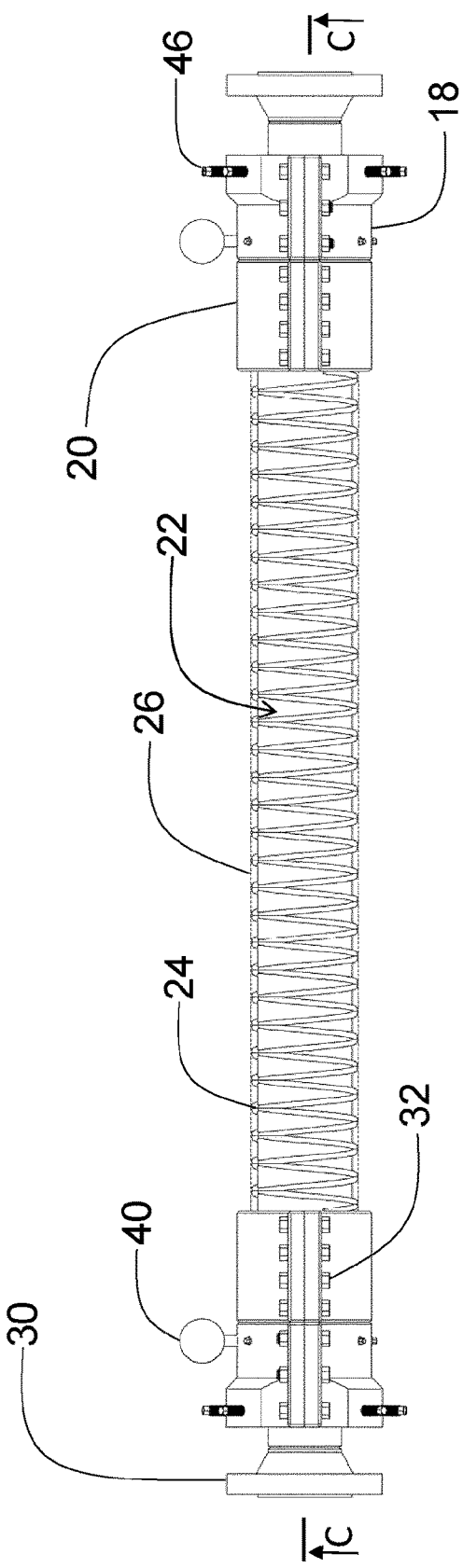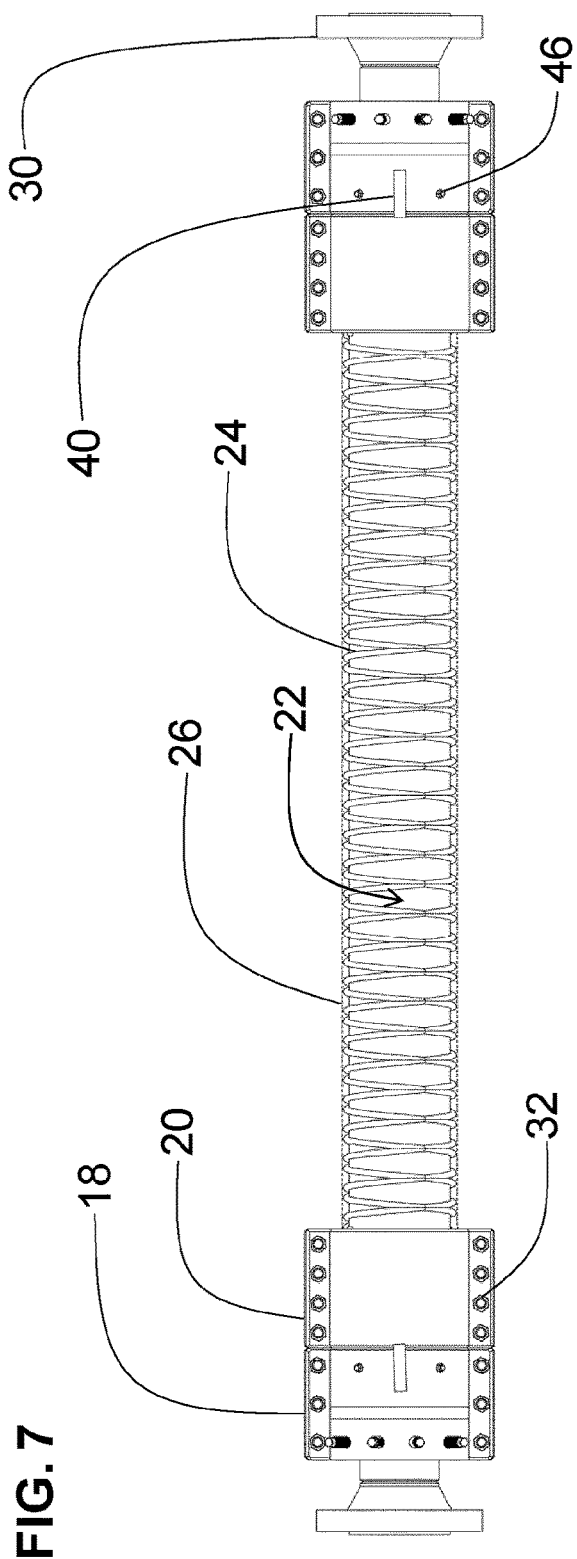

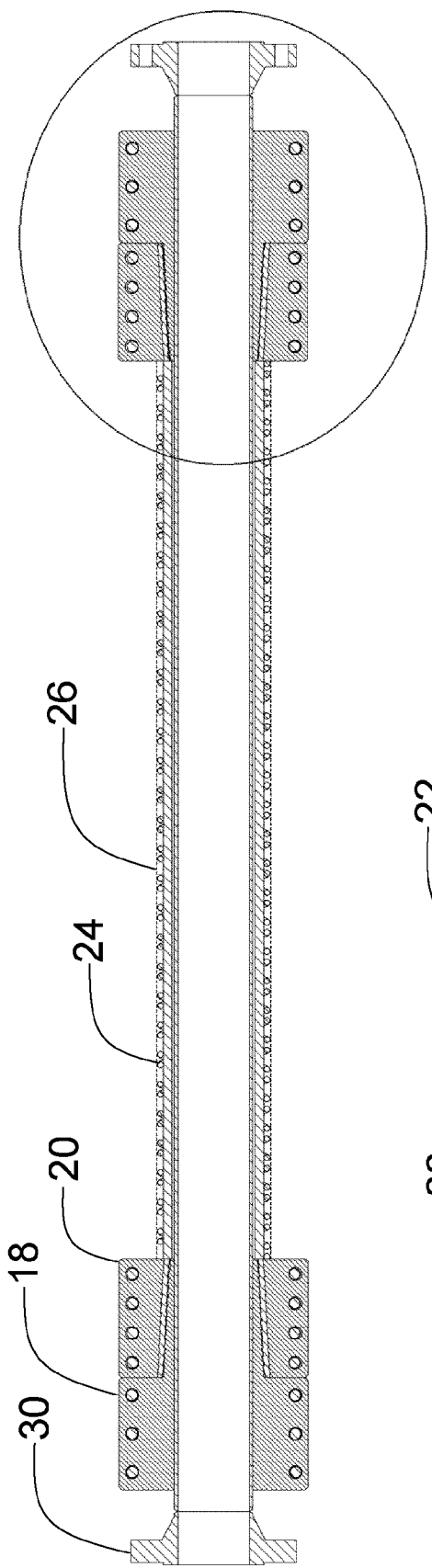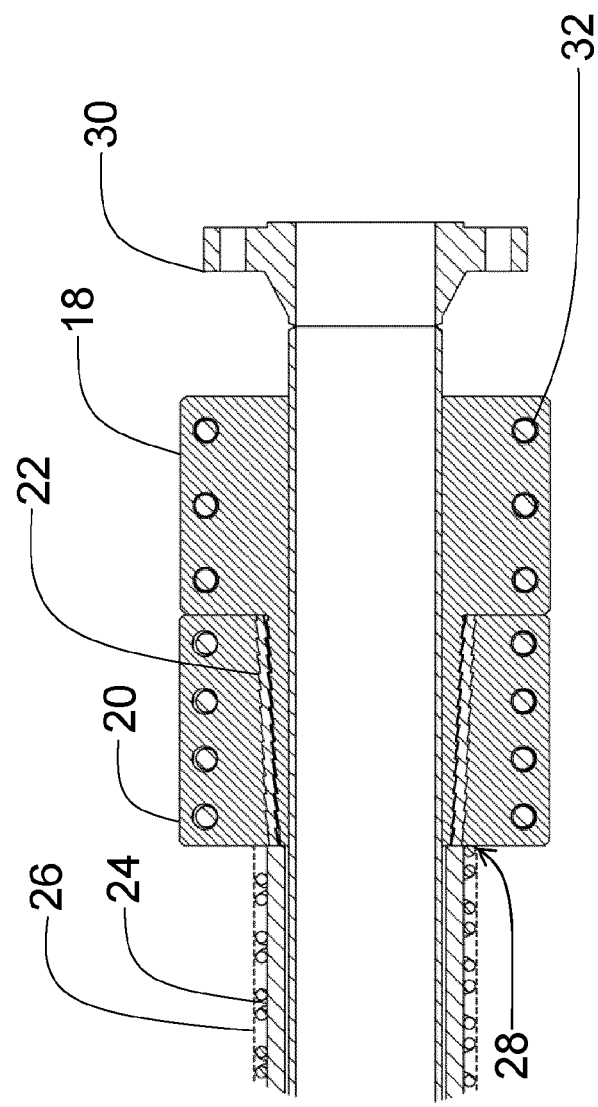

PIPELINE-LEAK-CONTAINMENT APPARATUS

CROSS REFERENCE TO RELATED APPLICATIONS

This application is a U.S. § 371 national phase application, which is based on International Application No. PCT/CA2020/050007 filed on Jan. 3, 2020 and published on Jul. 9, 2020 as WO2020/140157A1, which claims the benefit of and priority to U.S. Provisional Patent Application No. 62/788,515 filed on Jan. 4, 2019, which is hereby incorporated by reference in its entirety. The entire contents of WO2020/140157A1 is hereby incorporated by reference in its entirety.

FIELD

The present disclosure generally relates to a pipeline-leak-containment apparatus for detecting and containing leaks in a pipeline, and more particularly to a kit-of-parts and method by which the pipeline-leak-containment apparatus can be provided and assembled on a pipeline.

BACKGROUND

Pipeline leaks are not an uncommon problem. Many pipelines currently in operation are susceptible to leaks, for example because they are or have become structurally deficient due to manufacturing defects, corrosion, erosion or other sources of damage to the structural integrity of the pipeline. These structural deficiencies may be intermittent or continuous in nature, and may become worse over time. Additionally, many pipelines operate under high pressures at one or more sections of the pipeline, thereby rendering that section particularly susceptible to leakage.

Downtime due to closure of a section of pipeline can be very costly and operators are often resistant to shut down a section of pipe for repair or replacement based only on a potential threat of an incident. Moreover, it is often not economically feasible to replace the pipeline, such as when deficiencies are only at confined sections of the pipeline.

To reduce the incidence of pipeline leakage, double-walled pipelines have been used in certain circumstances. In essence, these double-walled pipelines are process pipelines (e.g., a fluid-carrying or gas-carrying pipeline) encased within another pipeline that is typically of similar structure to the process pipeline. However, doubled-walled pipelines are not routinely used because they are complex and very costly to design and construct, partly because of the extra welds required and significant lengths of additional pipeline. Also, it is more difficult to monitor a double-walled pipeline since the outer pipeline permanently blocks access to the internal process pipeline, and inline inspection tools are unable to evaluate the condition of the outer pipe. Further, the outer pipe frequently interferes with maintenance efforts on the process pipeline.

Consequently, there is a real need to develop a pipeline-leak-containment apparatus that is of suitable construction to be easily assembled on an existing pipeline, such as in sections deemed to have structural deficiencies, and which is durable enough to provide sufficient leak containment, including leak detection.

SUMMARY

The present disclosure recognizes that there are problems in the current existing technology in respect of preventing and handling pipeline leaks, including both minor leaks and more significant blowouts. Existing containment technologies, for example, are not of sufficient construction to handle the operating pressures found in some pipelines; are highly susceptible to leaks in the event of a leak in the process pipeline; are subject to unacceptable amounts of buckling or movement along the process pipe in the event of a leak; are not suitable for installation on an existing pipeline; do not provide a means of leak detection; and/or are not removable from the fluid-carrying pipeline.

An advantage of the present disclosure is the provision of a pipeline-leak-containment apparatus, a kit-of-parts and methods having improved characteristics over existing technologies.

In an embodiment, the present disclosure relates to a pipeline-leak-containment apparatus comprising: an elongate tubular containment wall comprising a first end opposite a second end and defining an internal bore therebetween, wherein the elongate tubular containment wall comprises an inner layer, a reinforcement layer and an outer layer; a first clamp comprising a first inner clamp and a first outer clamp, wherein at least the inner layer at the first end of the elongate tubular containment wall is sealingly sandwiched between the first inner clamp and first outer clamp; and a second clamp comprising a second inner clamp and a second outer clamp, wherein at least the inner layer at the second end of the elongate tubular containment wall is sealingly sandwiched between the second inner clamp and the second outer clamp; wherein, when the pipeline-leak-containment apparatus is positioned around a section of pipe, the first and second inner clamps sealingly engage the pipe to form a sealed interstitial space between the elongate tubular containment wall and the pipe.

In another embodiment, the present disclosure relates to a kit-of-parts for providing leak containment to a pipeline, the kit-of-parts comprising: an elongate split wrap having opposing ends, that when sealed together at the opposing ends forms an elongate tubular wall comprising a first end opposite a second end and defining an internal bore therebetween; a reinforcement material, for external application to the elongate tubular wall to form a reinforced pipe; a coating material, for application to an external surface of the reinforced pipe to form a containment pipe; and two or more clamps, each clamp comprising an inner clamp and an outer clamp and configured for sealingly sandwiching at least the elongate tubular wall between the inner clamp and the outer clamp; and wherein the two or more clamps are further configured for sealingly engaging a section of pipe.

In another embodiment, the present disclosure relates to a method for providing leak containment to a section of pipe in a pipeline, the method comprising: applying an elongate split wrap comprising two opposing ends around a section of pipe; sealing together the opposing ends of the elongate split wrap to form an elongate tubular wall surrounding the section of pipe; in any order: applying a reinforcement material to an external surface of the elongate tubular wall to form a reinforced pipe, and then externally applying a coating material onto the reinforced pipe to form a containment pipe; sealing a first end of at least the elongate tubular wall by sandwiching the first end between a first inner clamp and a first outer clamp of a first clamp, wherein the first clamp sealingly engages the section of pipe; and sealing a second end of at least the elongate tubular wall by sandwiching the second end between a second inner clamp and a second outer clamp of a second clamp, wherein the second clamp sealingly engages the section of pipe.

BRIEF DESCRIPTION OF THE DRAWINGS

Further advantages, permutations and combinations of the present disclosure will now appear from the above and from the following detailed description of the various particular embodiments of the present disclosure taken together with the accompanying drawings, each of which are intended to be non-limiting, in which:

FIG. 6 is a side elevational view of a pipeline-leak-containment apparatus, assembled and in position around a section of pipe, and further showing leak-detection equipment and drag studs.

FIG. 7 is a top elevational view of the pipeline-leak-containment apparatus of FIG. 6, assembled and in position around a section of pipe.

FIG. 8 is a cross-sectional view along line A-A of the pipeline-leak-containment apparatus shown in FIG. 5.

FIG. 9 is an enlarged view of detail B shown in FIG. 8, showing the inner layer of the tubular containment wall sandwiched between the inner clamp and outer clamp.

DETAILED DESCRIPTION

Figure 1:
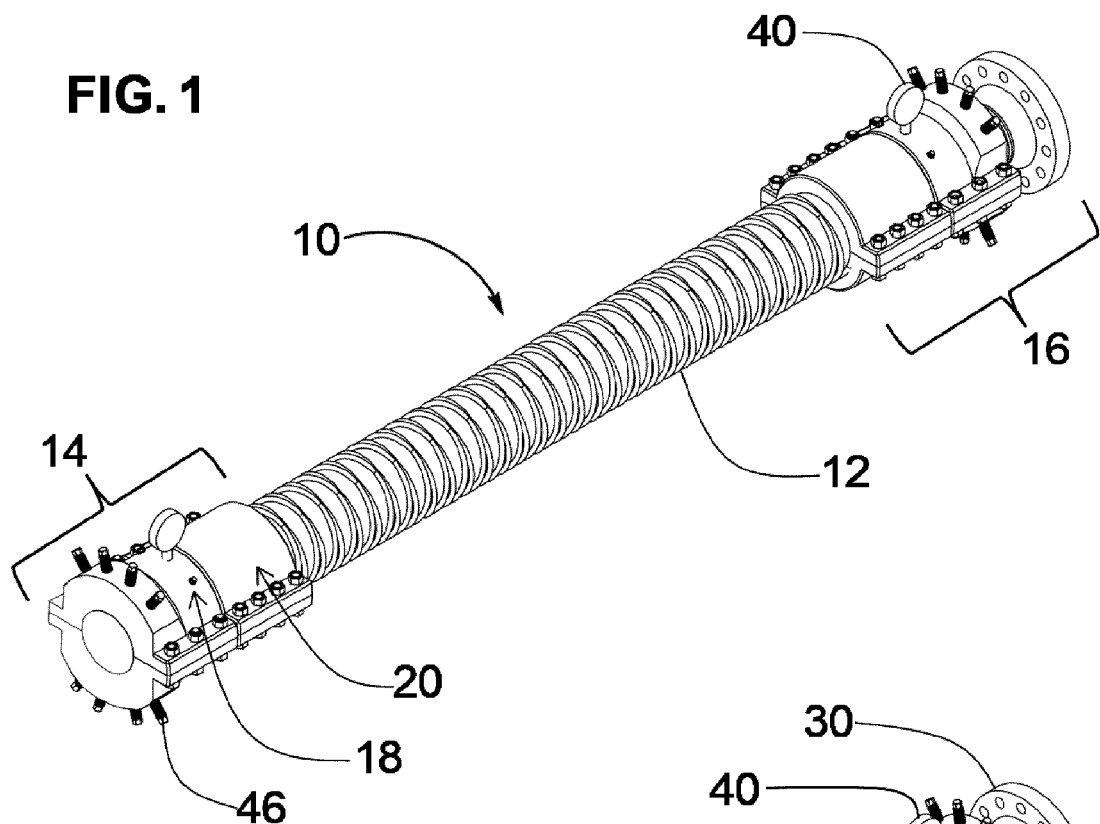
FIG. 1 is a perspective view of a pipeline-leak-containment apparatus, assembled but not in position around a section of pipe.

It is an objective of the present disclosure to provide an advantageous pipeline-leak-containment apparatus, a kit-of-parts for providing the pipeline-leak-containment apparatus and methods of employing the pipeline-leak-containment apparatus.

Pipeline leaks are not an uncommon problem. Whether the pipelines are transporting water or a more hazardous fluid or gas (e.g. oil, gasoline, natural gas, etc.), the passage of time results in increased incidents of leaks and increasing concerns over structural integrity. Moreover, many pipelines are located in sensitive workspaces (e.g. building facilities) or remote environmental areas where uncontained leaks cause major concerns for health and/or safety and damage to sensitive ecosystems.

One advantage of the present disclosure is the provision of a pipeline-leak-containment apparatus having improved characteristics over existing technologies, such as double-walled pipelines.

Another advantage of the present disclosure is the provision of a pipeline-leak-containment apparatus that is capable of easily being installed on an existing pipeline, including while the pipeline is in operation. This may be achieved by an embodiment of the containment apparatus in which the containment pipe is provided as an elongate split wrap for application around a section of pipe, and subsequently the reinforcement and coating materials are added.

Alternatively, the pipeline-leak-containment apparatus may be installed on a section of pipe prior to or during assembly of the process pipeline. The pipeline-leak-containment apparatus disclosed herein is advantageous in providing this flexibility.

A further advantage of the present disclosure is the provision of a pipeline-leak-containment apparatus comprising an elongate tubular containment wall that is of suitable construction (e.g. design and materials) to withstand high operating pressures that are present in some process pipelines. The tubular containment wall of the present disclosure is of a three-layer design providing both flexibility and strength. Moreover, sandwiching of the inner layer of the tubular containment wall between clamps at each end of the containment apparatus may provide a strong, leak-proof seal. It is an advantageous design that in certain embodiments only the inner layer of the tubular containment wall may be sandwiched between the clamps.

A still further advantage of the present disclosure is the provision of a pipeline-leak-containment apparatus in which the tubular containment wall is flexible in that it has the ability to deform to a certain degree. This may be advantageous as rigid structures can rupture under significant pressure.

A still further advantage of the present disclosure is the provision of a pipeline-leak-containment apparatus in which the clamps at each end may include drag studs that can abut against the process pipe and prevent movement of the respective clamp along the process pipeline. Thus, in the event of a significant leak or blowout whereby the pressure inside the containment apparatus becomes significantly high, the drag studs resist the pressure against the clamps and assist in holding the clamps in place to maintain containment of the leak.

A yet further advantage of the present disclosure is the provision of a pipeline-leak-containment apparatus that may be interconnected to an adjacent pipeline-leak-containment apparatus to extend the length of leak containment. This may be accomplished by an embodiment of the present disclosure whereby the inner clamp at the end of the containment apparatus has a double-sided design that allows an outer clamp to attach to both sides of the inner clamp.

A yet further advantage of the present disclosure is the provision of a pipeline-leak-containment apparatus that may comprise leak-detection equipment. In an embodiment, the leak-detection equipment is interconnected to the containment apparatus by ports in the clamps. Ports in the inner clamps are in fluid communication with an interstitial space formed between the tubular containment wall and the process pipeline. In an embodiment, the leak-detection equipment comprises a source of inert gas and a pressure sensor, whereby a change in pressure of pressurized inert gas in the interstitial space indicates a breach or leak in the pipeline. A further advantage is that in certain embodiments the ports in the inner clamps may be in fluid communication with a containment apparatus on both sides of the clamp when a double-sided clamp is used.

Still other advantages and benefits of the pipeline-leak-containment apparatus, kit-of-parts and methods disclosed herein will become apparent to those skilled in the art upon a reading and understanding of the following detailed description.

In an embodiment, the present disclosure provides a pipeline-leak-containment apparatus comprising: an elongate tubular containment wall comprising a first end opposite a second end and defining an internal bore therebetween, wherein the elongate tubular containment wall comprises an inner layer, a reinforcement layer and an outer layer; a first clamp comprising a first inner clamp and a first outer clamp, wherein at least the inner layer at the first end of the elongate tubular containment wall is sealingly sandwiched between the first inner clamp and first outer clamp; and a second clamp comprising a second inner clamp and a second outer clamp, wherein at least the inner layer at the second end of the elongate tubular containment wall is sealingly sandwiched between the second inner clamp and the second outer clamp; wherein, when the pipeline-leak-containment apparatus is positioned around a section of pipe in a pipeline, the first and second inner clamps sealingly engage the pipe to form a sealed interstitial space between the elongate tubular containment wall and the pipe.

Throughout the present disclosure, "pipeline-leak-containment apparatus" may be used interchangeably with "containment apparatus". As used herein, a "pipeline-leak-containment apparatus" refers to a structure or system that may be placed around a section of pipe in a process pipeline to contain leaks. The "process pipeline" may be a pipeline carrying any type of fluid, gas or chemical, including without limitation oil, natural gas, ammonia, gasoline, alcohol fuels, hydrogen, water, steam, hazardous materials, hazardous waste, chemicals and drainage or runoff from process plants, manufacturing plants and food-processing plants. The section of pipe for containment may be of any desired length, and the length will often depend on certain variables, such as the operating pressure of the process pipeline and conditions of the external environment. In an embodiment, the section of pipe for containment is between about 1-10 meters in length. However, longer or shorter lengths are contemplated, and in a particular embodiment, longer sections may be contained by employing adjacent containment apparatuses, which may be connected by a shared clamp.

In an embodiment, the pipeline-leak-containment apparatus may be placed on an existing process pipeline. By "existing process pipeline" or "existing pipeline", it is meant a pipeline that is already installed at its desired location. The existing pipeline may be operational, ready for operation or in a suspended or a shutdown status. In an existing pipeline, the section of pipe for containment would be located within a continuous chain of piping. The containment apparatus may be placed on the existing process pipeline while it is in operation (i.e. carrying fluid or gas), before operation begins, and/or while operation is suspended. A containment apparatus as disclosed herein may be placed on different sections of the same pipeline at different times.

In another embodiment, the pipeline-leak-containment apparatus may be placed on a section of pipe at any time during or between the manufacture of the pipe and its installation at a desired site. In an embodiment, the containment apparatus may be placed on a section of pipe shortly after its manufacture and transported to its desired installation site as a single, combined unit.

Reference will now be made in detail to exemplary embodiments of the disclosure, wherein numerals refer to like components, examples of which are illustrated in the accompanying drawings that further show exemplary embodiments, without limitation.

Pipeline-Leak-Containment Apparatus

Referring to FIG. 1 of the drawings, an exemplary embodiment of the pipeline-leak-containment apparatus 10 is shown. For further perspective, in FIG. 2 the pipeline-leak-containment apparatus 10 is shown in place on a section of pipe 30.

Figure 2:
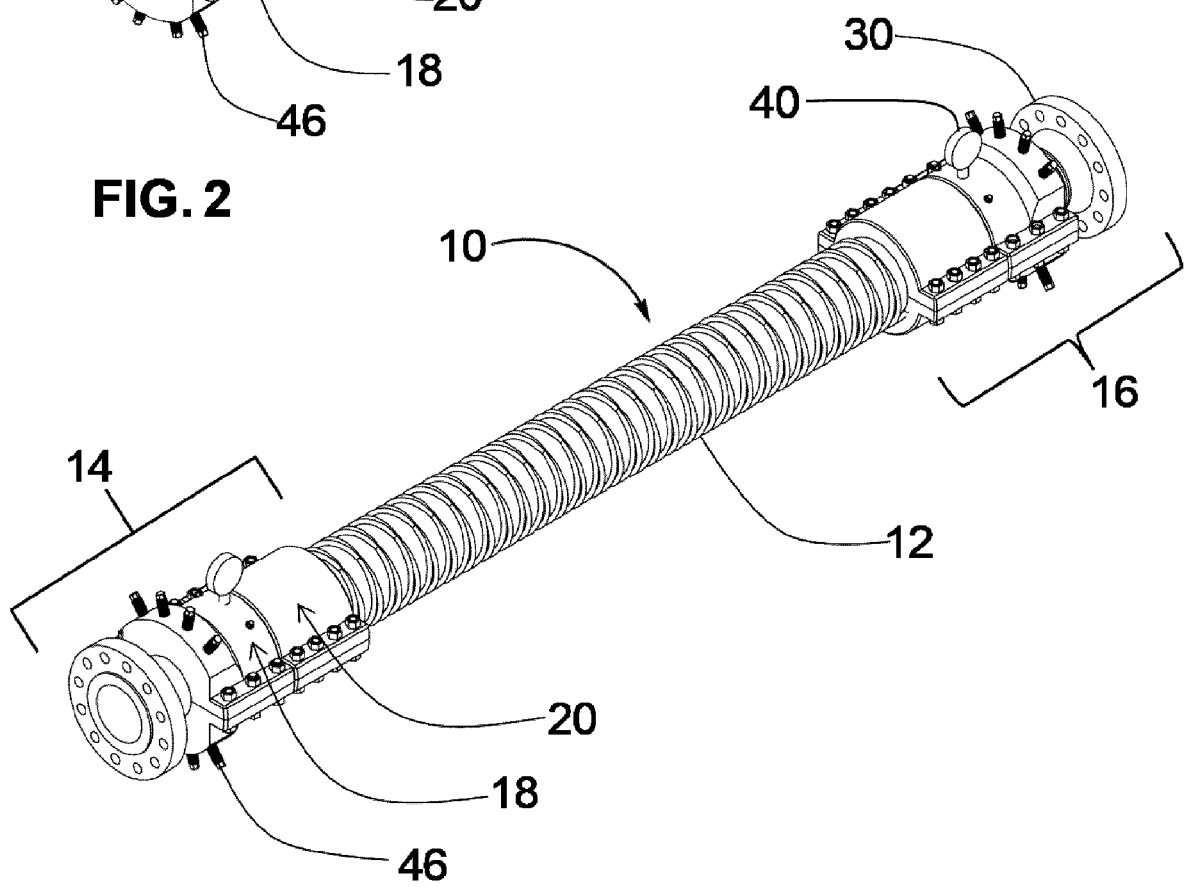
FIG. 2 is a perspective view of a pipeline-leak-containment apparatus, assembled and in position around a section of pipe.

As shown in FIGS. 1 and 2, the pipeline-leak-containment apparatus 10 comprises an elongate tubular containment wall 12 and a first clamp 14 and a second clamp 16. The elongate tubular containment wall 12 comprises a first end opposite a second end, defining an internal bore therebetween (e.g. a pipe). As will be appreciated, reference herein to a "first clamp" and a "second clamp" is to give context to the opposite locations of the clamps at a first end and a second end of the elongate tubular containment wall 12. Unless specified otherwise herein, the description of the clamps applies equally to both the first clamp 14 and the second clamp 16. For ease of reference, the first clamp 14 and second clamp 16 may be referred to herein simply as "clamps" or "end clamps".

Figure 11:
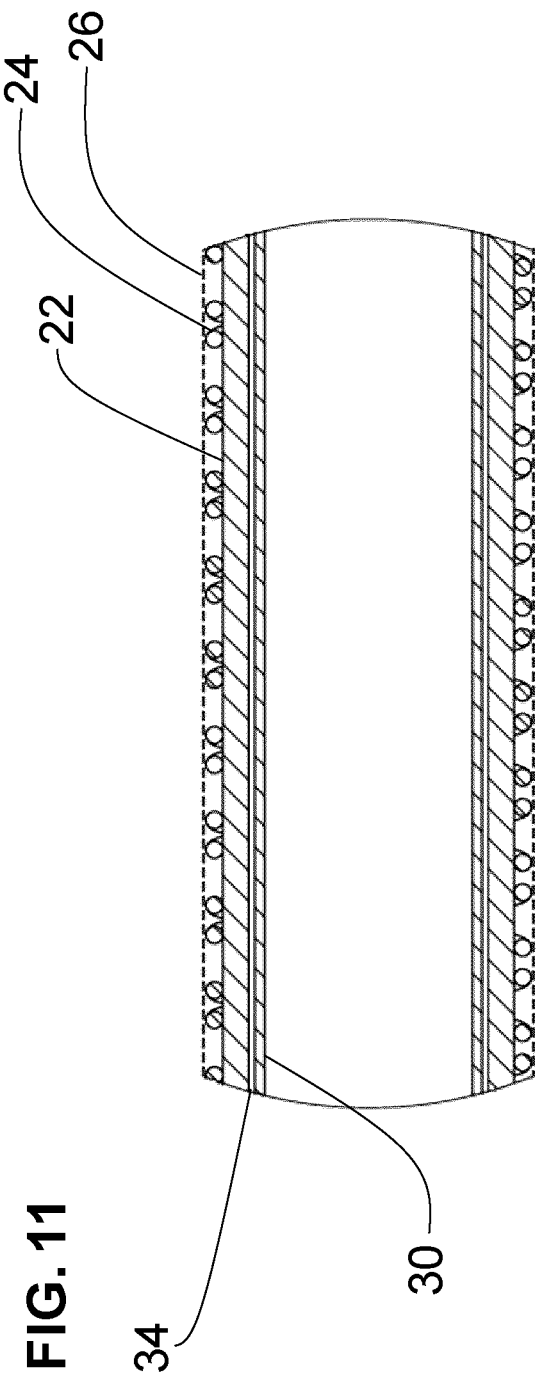
FIG. 11 is an enlarged view of detail D shown in FIG. 10, showing the layers of the containment pipe, the interstitial space and the process pipe.

The structure and composition of the elongate tubular containment wall 12 is shown in greater detail in FIG. 11. By "elongate", as used herein, it is meant that the tubular containment wall 12 is longer than it is wide. The tubular containment wall 12 comprises an inner layer 22, a reinforcement layer 24 and an outer layer 26. The inner layer 22 is on the inner side of the tubular containment wall 12. It is the surface defining the internal bore and is the layer closest to the process pipe 30 when the containment apparatus 10 is in place on a section of pipe 30. The outer layer 26 is opposite the inner layer 22 and is exposed to the external environment. The reinforcement layer 24 may be between the inner layer 22 and the outer layer 26. Notably, in some embodiments, the outer layer 26 may not completely cover the reinforcement layer 24. Further, in other embodiments, the reinforcement layer 24 may be the outer layer 26. While inner layer 22 runs the full length of the tubular containment wall 12 from the first end to the opposite second end, the reinforcement layer 24 and outer layer 26 in some embodiments do not extend to the ends of the tubular containment wall 12. An advantage of this is to provide a section of the tubular containment wall 12, at each end, that comprises only the inner layer for sealingly engaging the clamps (14 and 16), which may improve the strength of the seal formed.

Herein, the terms "elongate tubular containment wall" or "tubular containment wall" are used interchangeably. The specification herein also describes an "elongate tubular wall" or "tubular wall". Notably, the elongate tubular containment wall 12 is distinct from the elongate tubular wall. Inclusion of the word "containment" is intended herein to mean that the structure comprises all three layers (inner layer 22, reinforcement layer 24 and outer layer 26), wherein the "tubular wall" comprises only inner layer 22. The "tubular containment wall" is also referred to herein, interchangeably, as a "containment pipe", which also comprises all three layers (inner layer 22, reinforcement layer 24 and outer layer 26). As noted above, in elongate tubular containment wall 12, the reinforcement layer 24 and outer layer 26 may not cover the full length of the tubular containment wall 12. This is likewise the case for the containment pipe. Notably, for the methods disclosed herein, it is contemplated that reference to "tubular wall" may in certain instances encompass embodiments in which the wall comprises one or both of the reinforcement material or coating material, depending on the order in which the steps are performed. The skilled person will appreciate the proper and intended meaning of "tubular wall" in this context, having regard to the sequence of the methods steps.

The inner layer 22 is formed of a material that is impermeable to inert gas as well as any fluid or gas that may be exposed thereto by a leak in the process pipeline. In an embodiment, the inner layer is a rubber material or an equivalent thereof. The rubber material may be a natural or synthetic rubber, or combination thereof. In an embodiment, the rubber material is a urethane rubber. In another embodiment, the rubber material is a neoprene rubber or a neoprene/nylon rubber. By an "equivalent thereof", it is meant any material having similar functional properties to rubber in respect of elasticity, hardness and permeability. In an embodiment, the rubber material or equivalent thereof has a Scale A Durometer hardness of between 50° Sh and 100° Sh. The thickness of the inner layer 22 will depend on the pipe 30 diameter and pressure rating. In an embodiment, the thickness of the inner layer 22 may be between about $\frac{1}{8}^{th}$ of an inch and about 1 inch. In a more particular embodiment, the thickness of the inner layer 22 may be between about $\frac{3}{16}^{th}$ of an inch and about ½ of an inch.

In an embodiment, the inner layer 22 may comprise or the internal wall of the inner layer 22 may be coated with a chemical neutralizer. In such embodiments, the inner wall 22 may serve the additional function of rendering inert or harmless certain chemicals that leak from the pipeline. In an embodiment, the chemical neutralizer may be ammonia.

The reinforcement layer 24 is formed of a material that is pliable to the extent that it can be wrapped around in close association with the external surface of the inner layer 22, but is also of sufficient strength that it, together with the inner layer 22, can handle the operating pressures of the process pipeline in the event of a leak. In an embodiment, the reinforcement layer 24 is a fabric or composite. In a particular embodiment, the reinforcement material is a metal or metallic alloy. The metal may be, for example and without limitation, iron, copper, aluminum, nickel, tin, titanium or magnesium, and the metallic alloy may be an alloy of these metals, such as steel. In an embodiment, the reinforcement material is made of steel. The steel may be conventional steel or high tensile steel. In an embodiment, the metal or metallic alloy used for the reinforcement layer 24 is in the form or a mesh, cable or braided cable. In an embodiment, the reinforcement layer 24 is braided stainless steel mesh, braided stainless steel cable or a combination of both.

The outer layer 26 may cover the reinforcement layer 24, in part or completely. Since embodiments of the reinforcement layer 24 include braided mesh and cables, it is possible that the outer layer 26 will not completely cover the reinforcement layer 24, but rather will largely fill the gaps between the mesh and cables. The outer layer 26 imparts further structural integrity to the tubular containment wall 12 and also provides a protective function. In an embodiment, the outer layer 26 may also function to bond the reinforcement layer 24 onto the inner layer 22.

In an embodiment, the outer layer 26 is a plastic or a bioplastic material. The fiber and polymer combinations that can be used to make plastics and bioplastics vary greatly, and will result in materials of varying density, tensile strength and rigidity. In an embodiment, the outer layer 26 is comprised of natural or synthetic fibers mixed with natural or synthetic polymers. Natural polymers may include, for example, tar, shellac, tortoiseshell, and many tree resins, while natural fibres may include jute, sisal, cotton, flax, and hemp. In another embodiment, the outer layer 26 is comprised of one or more polymer resins. In an embodiment, the outer layer 26 is comprised of hemp fibers mixed with one or more polymer resins. In another embodiment, the outer layer 26 is comprised of hemp fibers mixed with a cement. Hemp fibres are well known for their tensile strength, particularly the fibres from the female plants. In a further embodiment, the outer layer 26 may comprise cellulose nanocrystals (CNC) mixed with one or more polymer resins. In a further embodiment, the outer layer 26 may comprise fibreglass mixed with one or more polymer resins. In an embodiment, the one or more polymer resins comprise polypropylene, polyethylene terephthalate (PET; $C_{10}H_8O_4$), polyurethane, epoxy (e.g. general-purpose or casting), polyurea, or any combination thereof. As mentioned above, the outer layer 26 provides structural integrity to the tubular containment wall 12. The thickness of the outer layer 26 will depend on the pipe 30 diameter and pressure rating. In an embodiment, the thickness of the outer layer 26 is between about $\frac{1}{8}^{th}$ of an inch and about 3 inches. In a particular embodiment, the thickness of the outer layer 26 is between about ¼ of an inch and 2 inches.

Further, as previously mentioned herein, in some embodiments the reinforcement layer 24 may be the outer layer 26. That is, the reinforcement material and the coating material, which form the reinforcement layer 24 and the outer layer 26, respectively, may be the same material (e.g. braided stainless steel mesh, braided stainless steel cable, etc.). Embodiments where the reinforcement layer 24 may be the outer layer 26 may be advantageous when elongate tubular containment wall 12 is installed in areas where the external environment is less likely to degrade or weather the reinforcement layer 24, such as in warm, dry climates.

Figure 10:
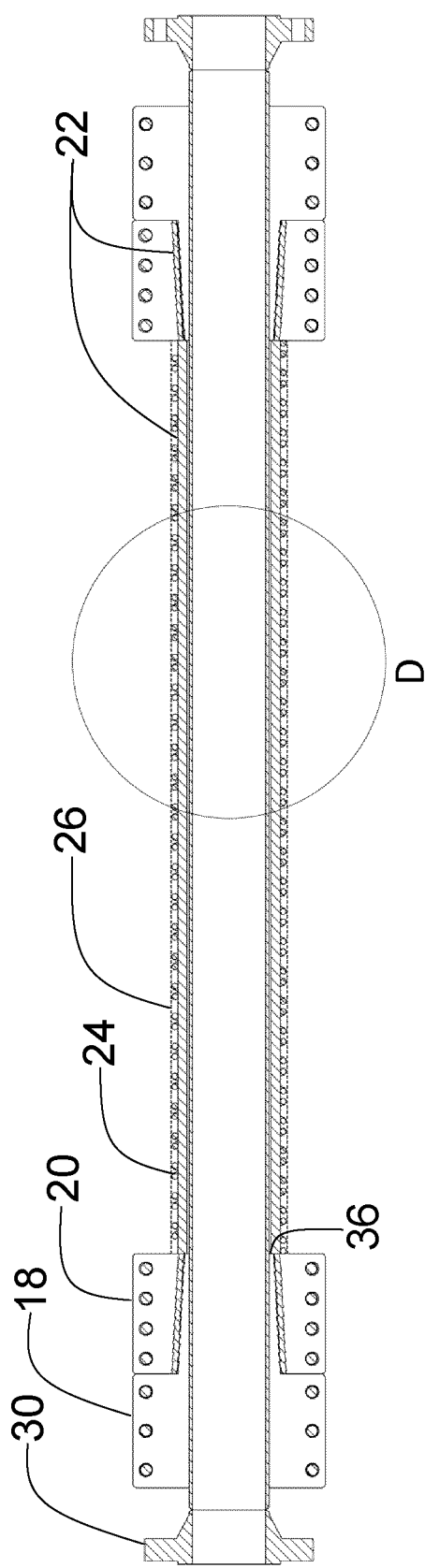
FIG. 10 is a cross-sectional view along line C-C of the pipeline-leak-containment apparatus shown in FIG. 6.

FIGS. 8, 9 and 10 are cross-sectional views of the pipeline-leak-containment structure 10 assembled on a section of pipe 30. The figures illustrate an exemplary embodiment of the tubular containment wall 12 sealingly sandwiched by the first and second clamps (14 and 16), whereby the clamps are split clamps. As used herein, by "sealingly sandwiched" it is meant that the engagement of the tubular containment wall 12 within the clamp (14 and 16) creates a seal such that process pipeline fluid and/or gas cannot escape in the event of a leak. As shown in an enlarged view in FIG. 9, the tubular containment wall 12 is sandwiched between an inner clamp 18 and an outer clamp 20 of the first and second clamps (14 and 16). Both the inner clamp 18 and the outer clamp 20 have a surface that aligns with opposite sides of the tubular containment wall 12. This is advantageous in providing a strong sealing engagement between the clamp (14 and 16) and the tubular containment wall 12. In a further embodiment in which leak-detection equipment is installed, as described elsewhere herein, "sealingly sandwiched" further means that the detection medium (e.g. inert gas) cannot escape.

In an advantageous embodiment, only the inner layer 22 of the tubular containment wall 12 is sandwiched between the inner and outer clamps (18 and 20). This feature enhances the tight sealing engagement within the clamps (14 and 16) because contact between the inner and outer clamps (18 and 20) and the tubular containment wall 12 is not impeded by the reinforcement layer 24, which is not as pliable as the inner layer 22. Moreover, in an embodiment, the outer layer 26 can be applied to the tubular containment wall 12, or the inner clamp 18 can be appropriately positioned, such that the proximal edge of the clamp (as indicated by 28 in FIG. 9) abuts the outer layer 26, further strengthening the sealing engagement between the clamp (18 and 20) and tubular containment wall 12.

In the exemplary embodiments shown in the drawings, the inner and outer clamps (18 and 20) are split clamps. Removable fastening members 32 interconnect the upper (18a and 20a) and lower (18b and 20b) sections of the split clamps (see FIGS. 3, 4, 14, and 15). Many types of split clamps are known and available in the art and the skilled person could select an appropriate version based on the process pipeline diameter, operating pressure, tubular containment wall 12 thickness, or inner wall 22 thickness. The split clamps (18 and 20) and fastening members 32 should be of sufficient design, material and strength to hold and maintain a sealing engagement with the tubular containment wall 12 (outer clamp 20) and with the process pipe 30 (inner clamp 18). In an embodiment, the split clamps (18 and 20) are heavy-duty split clamps made of metal or a metallic alloy, such as those metals and metallic alloys described above. In an embodiment, the split clamps (18 and 20) are made of steel. In a particular embodiment, the split clamps (18 and 20) are made of AISI 4140 steel, which is a low alloy steel containing chromium, molybdenum, and manganese. The split clamps (18 and 20) include one or more fastening members 32 on each side. In an embodiment, the split clamps (18 and 20) have 1, 2, 3, 4, 5 or more fastening members 32 on each side. The fastening member 32 may be of any suitable design that permits tightening of the split clamps (18 and 20). In an embodiment, the fastening member 32 is a screw, stud, or bolt and the split clamps (18 and 20) are threaded. In an embodiment, the fastening member 32 is a screw, stud, or bolt secured with a nut (e.g. hex nut), and the split clamp (18 and 20) is optionally threaded. In an embodiment, and referring to FIG. 3, each fastening member 32 is comprised of a stud 48 affixed on both ends by a nut 50, and the split clamp is not threaded. In an embodiment, the stud is a flange stud.

Other types of clamps may be used and would be within the knowledge of the skilled person. For example and without limitation, the inner clamp 18 and/or outer clamp 20 could be of a design in which one side of the clamp (18 and/or 20) has a fastening member 32 and the other side has a hinge that allows the clamp (18 and/or 20) to open and close. In this regard, it is preferable that both the inner clamp 18 and outer clamp 20 are capable of opening such that they can be placed around or removed from the section of pipe 30 without sliding the clamp over a disconnected end of the pipeline.

Figure 3:
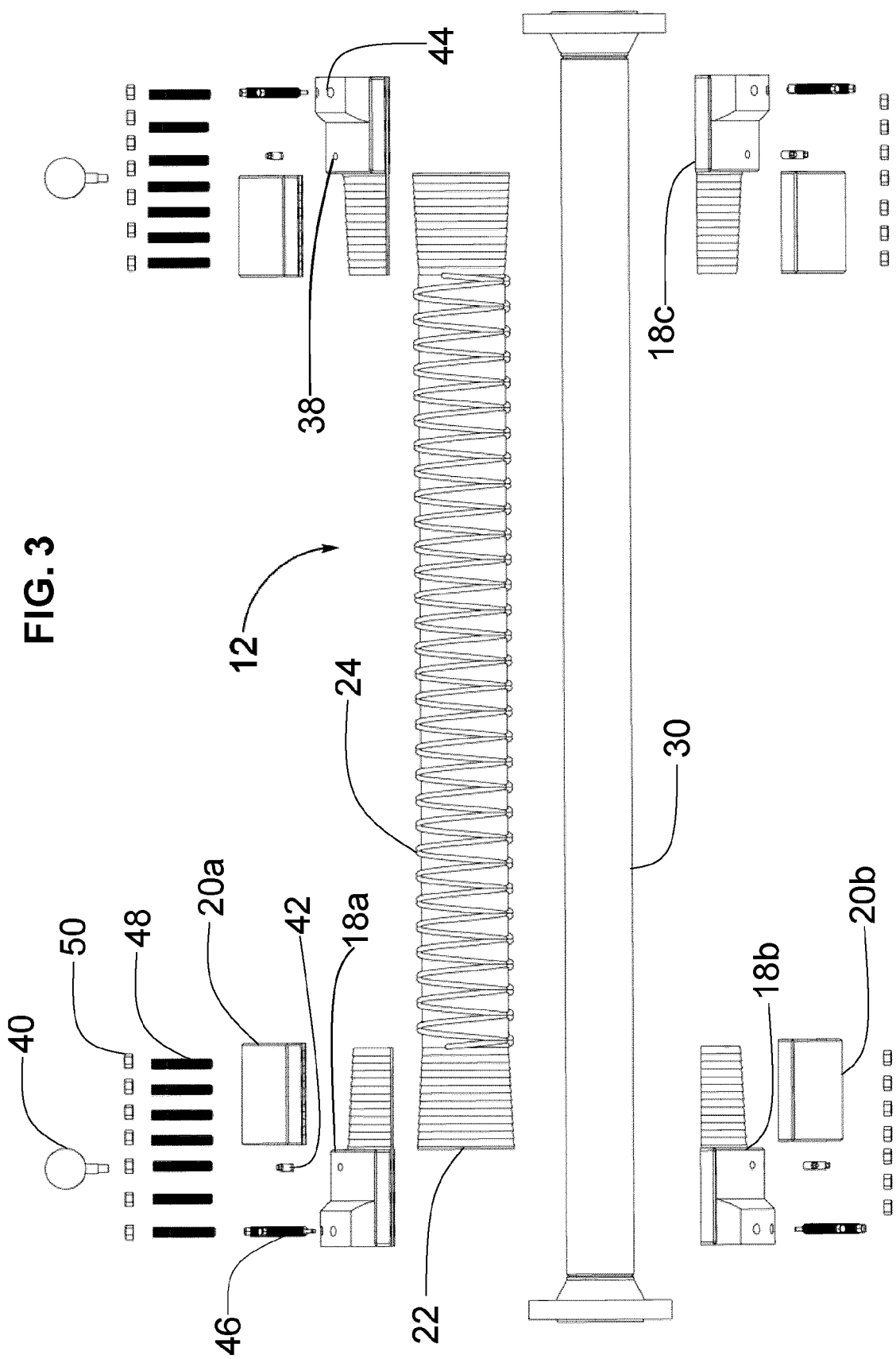
FIG. 3 is a perspective view of individual components (dissembled) of a pipeline-leak-containment apparatus, including the process pipe on which the apparatus would be assembled.
Figure 4:
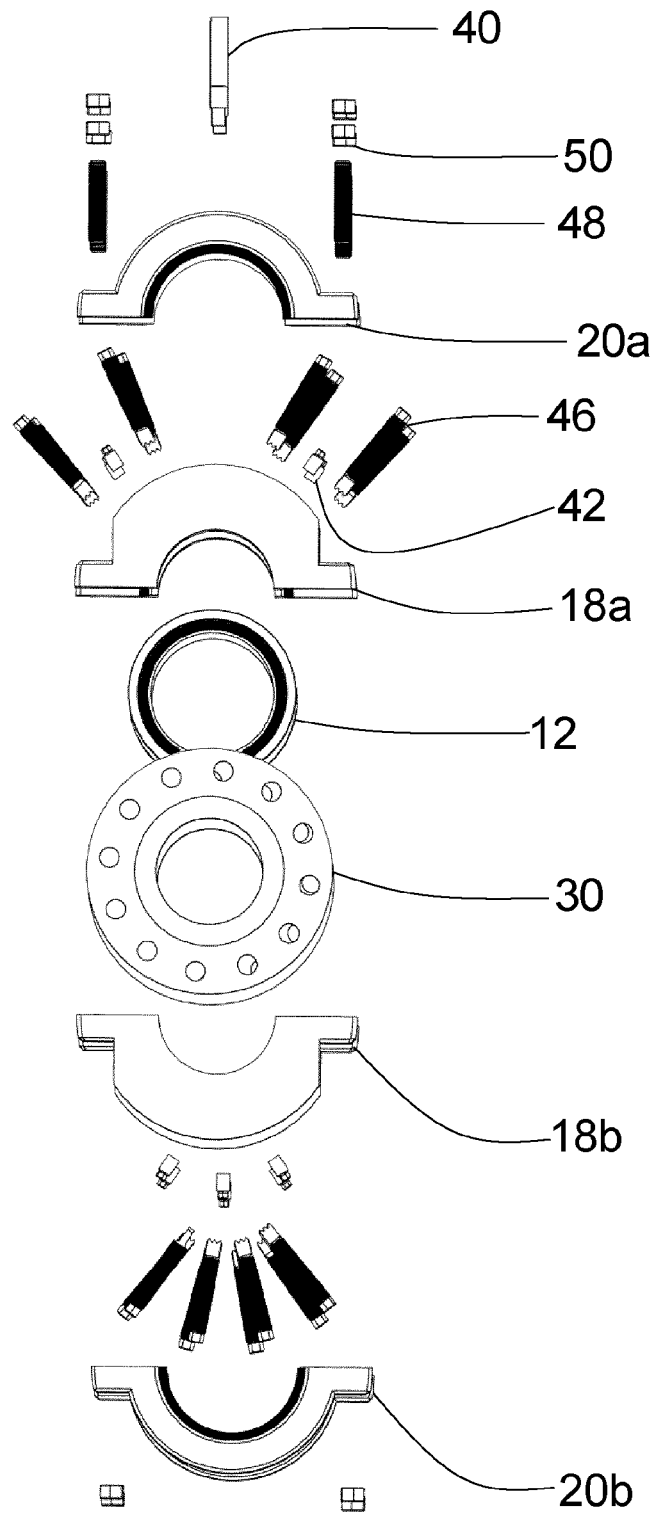
FIG. 4 is a side view of FIG. 3, looking down the end of the process pipe with each of the pipeline-leak-containment apparatus components lined up, top to bottom, in similar order as shown in FIG. 3.
Figure 14:
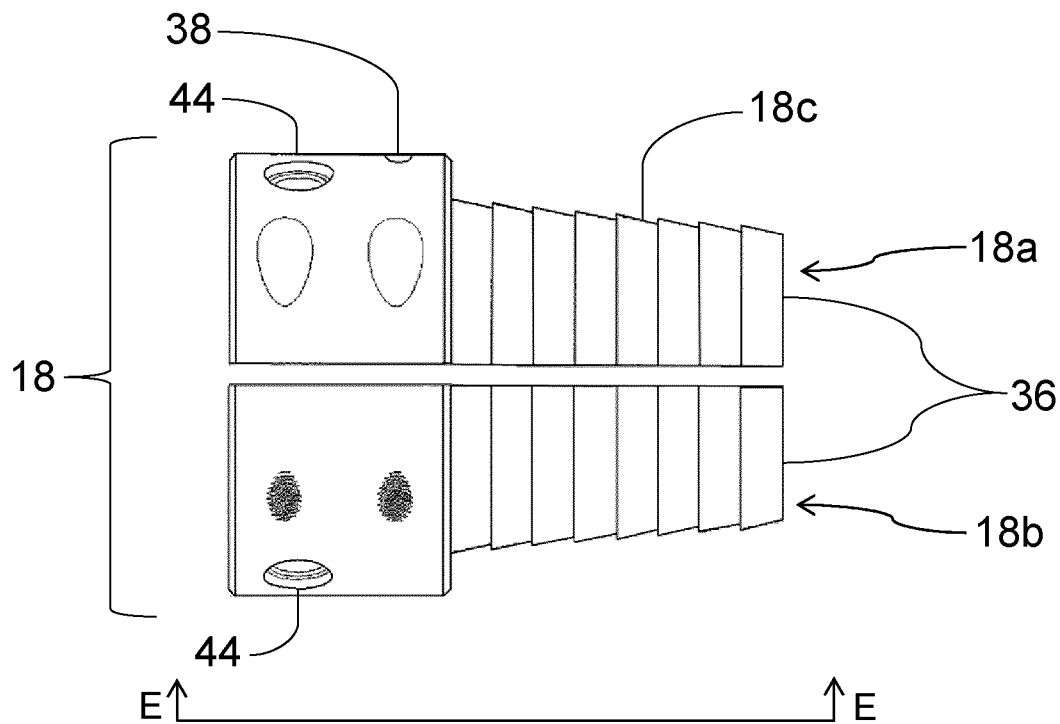
FIG. 14 is a side view of an inner clamp.
Figure 15:
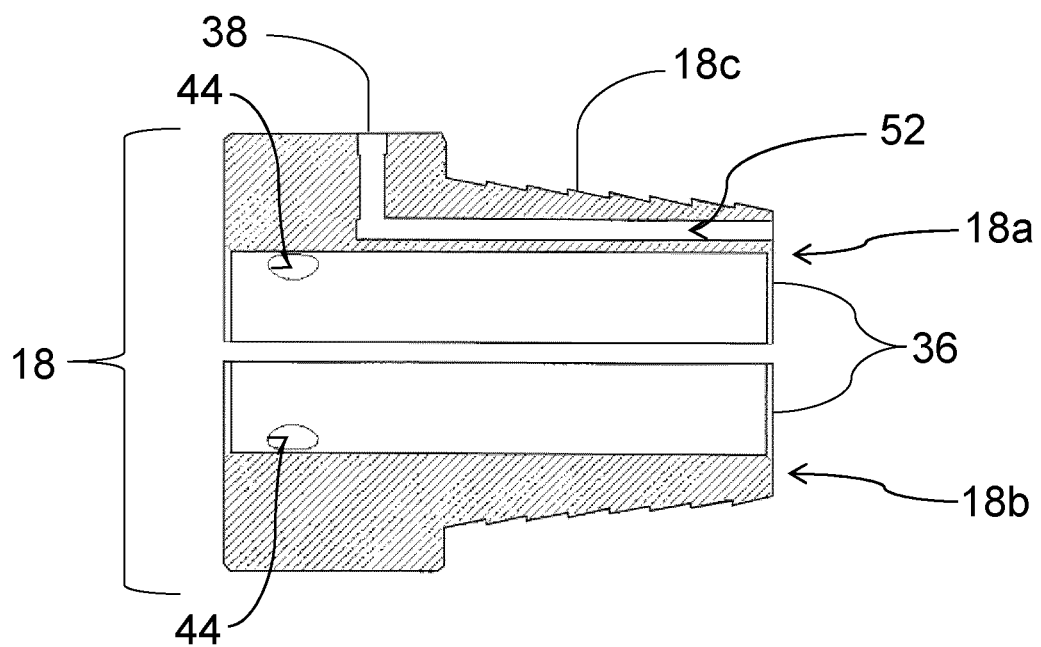
FIG. 15 is a cross-sectional view along line E-E of the inner clamp shown in FIG. 14.

In an embodiment, the surface of the inner clamp 18 and/or outer clamp 20 that contacts the tubular containment wall 12 comprises protrusions, such as for example ridges, conical bumps, or other structures. An exemplary embodiment of an inner clamp 18 having ridges is shown in FIGS. 3, 14, and 15 by feature 18c. The protrusions should not be of a design that hinders the tubular containment wall 12 from being sealingly sandwiched between the inner and outer clamps (18 and 20), but rather may be included to assist in the sealing engagement by reducing any chance of slippage of the tubular containment wall 12 from within the clamps (14 and 16).

In addition to sealingly engaging the tubular containment wall 12, the inner clamp 18 also sealingly engages the pipe 30 when the pipeline-leak-containment apparatus 10 is positioned around a section of pipe 30. As used herein, by "sealingly engage" it is meant that the fixed placement of the inner clamp 18 on the pipe 30 creates a seal such that process pipeline fluid and/or gas cannot escape in the event of a leak. "Fixed placement" means that the inner clamp 18 is tightened or fastened onto the pipe 30 in an operational configuration, as opposed to being loosely attached to the pipe 30 as may be desired during installation of the containment apparatus 10 (e.g. so the inner clamp 18 can be moved and properly positioned). In a further embodiment in which leak-detection equipment is installed, as described elsewhere herein, "sealingly engage" further means that the detection medium (e.g. inert gas) cannot escape from between the inner clamp 18 and the pipe 30.

In an embodiment, one or both of the inner and outer clamps (18 and 20) may be lined with a pliable material (e.g. rubber-lined) at the region that contacts the tubular containment wall 12. In a further embodiment, the inner clamp 18 may be lined with a pliable material (e.g. rubber-lined) at the region that contacts the pipe 30. In instances where the outer clamp 20 is lined with a pliable material at the region that contacts the tubular containment wall 12, it is contemplated that the section of the tubular containment wall 12 sandwiched by the inner and outer clamp (18 and 20) may include the reinforcement layer 24 and optionally, further the outer layer 26. This may be in contrast to other embodiments herein where only the inner layer 22 is sandwiched, because in this embodiment the outer clamp 20 includes a pliable material (e.g. a rubber) at the surface that contacts the tubular containment wall 12. In an aspect of these embodiments, the inner and outer clamps (18 and 20) may be split clamps. In an embodiment, the split clamps are rubber-lined, metal or metallic alloy split clamps.

As shown in FIG. 10, and by the enlarged view in FIG. 11, when the pipeline-leak-containment apparatus 10 is positioned around a section of pipe 30, the first and second clamps (14 and 16) form a sealed interstitial space 34 between the elongate tubular containment wall 12 and the pipe 30. The interstitial space is sealed by the outer clamp 20 and inner clamp 18 sealingly sandwiching the tubular containment wall 12 and the inner clamp 18 sealingly engaging the pipe 30. As will be appreciated, the size of the interstitial space 34 will depend on the length of the containment apparatus 10 and the thickness of the inner clamp 18 at the region where it forms a wall of the interstitial space 34, as shown in FIG. 10 by feature 36.

An embodiment of the present disclosure involves the use of a pressurized inert gas within the interstitial space 34 to detect the occurrence of leaks in the pipeline. In such embodiments, one or both of the first and second inner clamps 18 includes at least one port 38 (see, for example, FIGS. 14 and 15) on at an external surface through which the inert gas may be introduced into or withdrawn from the interstitial space 34. The port 38 is in fluid communication with the interstitial space 34 by a channel 52 spanning through the inner clamp 18 to wall 36. By "fluid communication" it is meant that the inert gas is able to pass through the channel from outside the containment apparatus 10 into the interstitial space 34. In an embodiment, at least a region of the channel nearest the external entrance of port 38 is threaded. Leak-detection equipment can be attached to port 38 at the external surface of the inner clamp 18. The leak-detection equipment may include, for example, a source of the inert gas and a pressure sensor 40. In further embodiments, the leak detection equipment may include locating devices, such as a GPS locator so that the section of pipeline containing a leak can be identified geographically.

In further embodiments, the leak detection equipment may include a pressure rating device so that the significance of the leak can be determined.

In an embodiment, a pressure sensor 40 is attached to a port 38 at one end of the pipeline-leak-containment apparatus 10. In another embodiment, a pressure sensor 40 is attached to a port 38 at both ends of the pipeline-leak-containment apparatus 10. The source of inert gas may be delivered through the same port to which the pressure sensor 40 is attached or the source of inert gas may be connected to a different port 38. Typically, the source of inert gas is disconnected from the pipeline-leak-containment apparatus 10 when inert gas is not being delivered or removed. Ports 38 may be plugged when not in use, such as with an NPT plug 42.

The pressure sensor 40 may be of various different configurations or designs. In an embodiment, the pressure sensor 40 is a pressure gauge. The pressure gauge may be capable of measuring a broad range of pressures, for instance from −1000 psi to +1000 psi. Alternatively, the pressure gauge may measure a more narrow pressure range, so long as the range encompasses the pressure at which the inert gas will be maintained in the interstitial space to monitor for a leak. In another embodiment, the pressure sensor 40 may be a colour change device. For example, during normal conditions a green light may display, but upon the occurrence of a leak the colour would change red. In another embodiment, the pressure sensor 40 may be an alarm, such as a siren. In another embodiment, the pressure sensor may be a 'pop-up' visual, similar to a turkey pop-up timer. Other types of pressure sensors would be known and available to the skilled person, and any one or combination thereof may be used in the leak detection system of the present disclosure.

The source of inert gas may be any source provided that it is capable of providing the inert gas to the interstitial space 34 at an appropriate pressure. In this regard, in order that leaks can be readily detected, the pressure of the inert gas in the interstitial space 34 should be different from the pressure of the fluid or gas in the process pipeline. In an embodiment, the pressure of the inert gas in the interstitial space 34 is less than the operating pressure in the pipeline. For example, in an embodiment, the pressure in the interstitial space 34 may be 10% to 25% of the operating pressure in the pipeline. In such embodiments, an increase in pressure in the interstitial space 34 would be indicative of a leak in the pipeline. Alternatively, the pressure of the inert gas in the interstitial space 34 may be greater than the operating pressure of the pipeline. For example, in an embodiment, the pressure of the inert gas in the interstitial space 34 may be 25% to 75% greater than the operating pressure. In such embodiments, a decrease in pressure in the interstitial space 34 would be indicative of a leak in the pipeline.

The inert gas may be any gas that does not react with the fluid or gas in the process pipeline. In an embodiment, the inert gas is nitrogen, carbon dioxide, helium, argon, neon, krypton, xenon, or radon. In a preferred embodiment, the inert gas is nitrogen. In an alternative embodiment, instead of using an inert gas, a vacuum is applied to the interstitial space in place of a pressurized inert gas.

Figure 5:
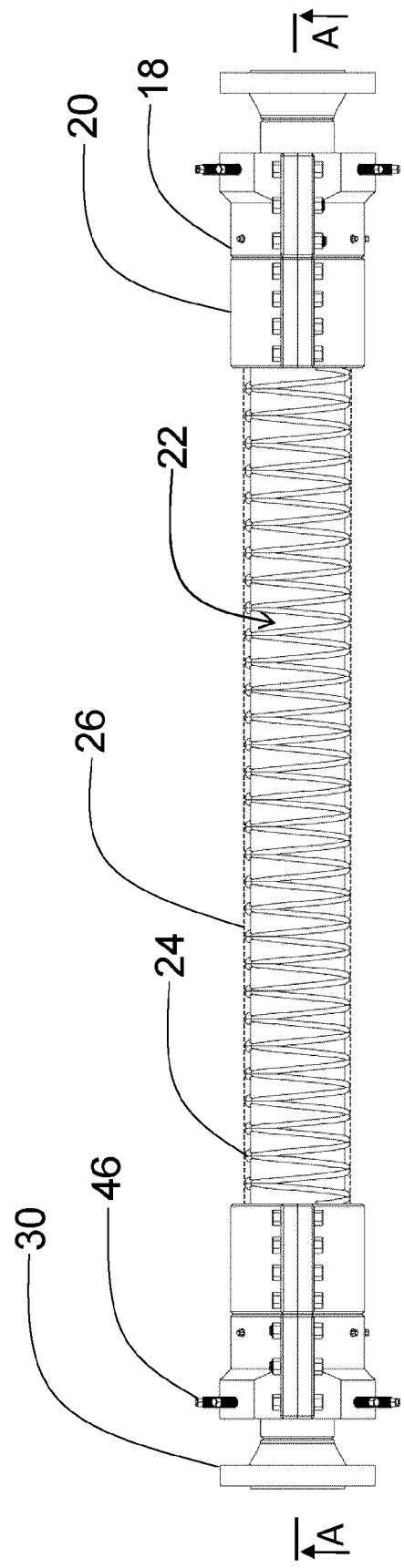
FIG. 5 is a side elevational view of a pipeline-leak-containment apparatus, assembled and in position around a section of pipe.
Figure 12:
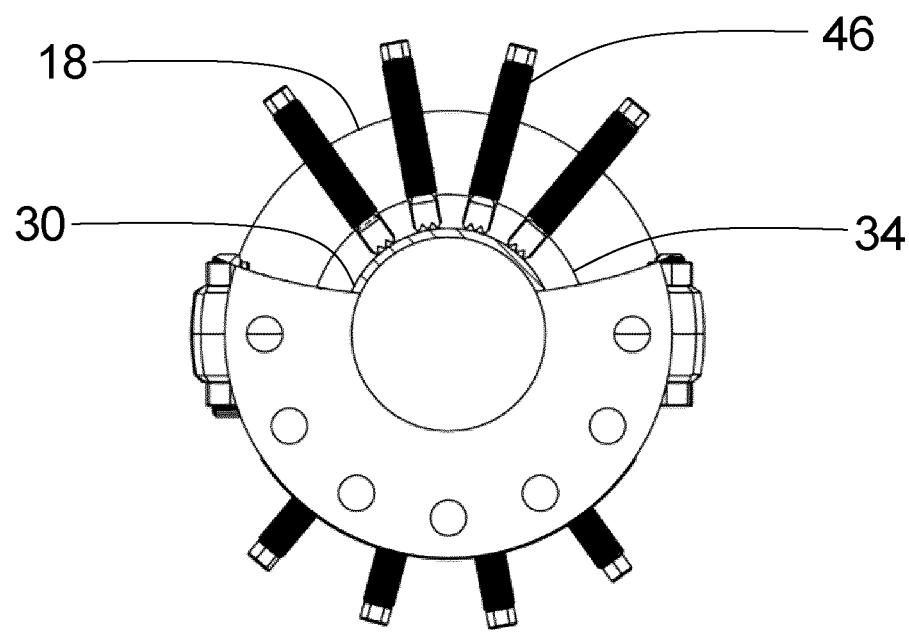
FIG. 12 is side view looking down the end of the pipeline-leak-containment apparatus shown in FIG. 5, including the process pipe which is partly removed to show the engagement of the drag studs against the process pipe at a section corresponding to the inner clamp.

In addition to the ports 34 for the leak-detection equipment, some embodiments of the pipeline-leak-containment apparatus 10 of the present disclosure comprise additional ports in the inner clamp 18, referred to herein as drag ports 44. The drag port 44 is a threaded port that is configured to house a drag stud 46. In an embodiment, one or both of the first and second inner clamps 18 comprise at least one drag port 44 and drag stud 46. In a preferred embodiment, both the first and second inner clamps 18 comprise drag ports 44 and drag studs 46. Preferably, the first and second clamps 18 comprise multiple drag ports 44 and drag studs 46, spaced substantially equidistant around the circumference of the inner clamp 18. In an embodiment, the inner clamps 18 comprise 1, 2, 3, 4, 5, 6, 7, 8, 9, 10 or more drag ports 44 and drag studs 46. Referring to FIG. 5, and FIG. 12 for a side view, once the clamps (14 and 16) are in position on a section of pipe 30, the drag stud 46 can be screwed into the drag port 44 to engage and abut up against the pipe 30. In doing so, the drag stud 46 acts as a lock to hold the clamps (14 and 16) in position along the pipeline. Thus, even when a substantive leak occurs, the pipeline-leak-containment system 10 of the present disclosure is supported in place by the drag ports 44 and drag studs 46, and has a greater likelihood to withstand the pressure of the leak as compared to conventional technologies.

In various situations, it may be useful to contain lengthy sections of pipe or an additional section of pipe 30 adjacent to an already contained section. The containment apparatus 10 of the present disclosure is particularly advantageous in such circumstances for a number of reasons. For example, the containment apparatus 10 can be assembled around a section of pipe 30 in an existing process pipeline thereby foregoing the need to disconnect and shut down the process pipeline to add another containment apparatus. Further, the containment apparatus 10 is of a design that can be assembled immediately adjacent another pipeline-leak-containment apparatus 10. Yet further, individual containment apparatuses 10 of the present disclosure can be interconnected along a process pipeline. In an embodiment, the inner clamp 18 may be a double-sided design, whereby on each longitudinal end of the inner clamp there is a surface for engaging the tubular containment wall 12.

Figure 13:
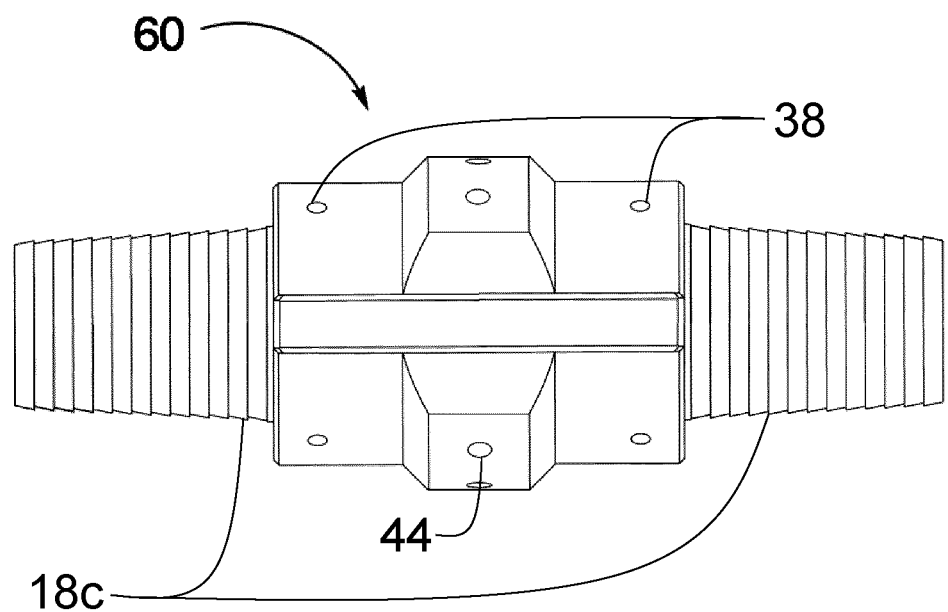
FIG. 13 is a perspective view of a double-sided inner clamp.

An example embodiment of such a double-sided inner clamp 60 is shown in FIG. 13. As can be seen, there are two surfaces 18*c* that are for engaging the tubular containment wall 12. The surfaces 18*c* are shown as ridged surfaces but, as described herein, this is an exemplary embodiment. The exemplary double-sided inner clamp 60 is shown in FIG. 13 as having ports 38 on both sides for interconnecting leak-detection equipment. However, these may be omitted or a single port 38 or set of ports 38 could serve both sides of the double-sided inner clamp 60. The double-sided inner clamp 60 may also include drag ports 44 and drag studs 46 (studs not shown) as shown in FIG. 13, and alternate configurations of such drag ports 44 and drag studs 46 would be readily appreciated.

Kit-of-Parts

Another aspect of the present disclosure is a kit-of-parts for providing leak containment to a process pipeline. The kit-of-parts would provide the components for assembling the pipeline-leak-containment apparatus 10 on a section of pipe 30.

In an embodiment, the kit-of-parts comprises: (i) an elongate split wrap having opposing ends, that when sealed together at the opposing ends, forms an elongate tubular wall comprising a first end opposite a second end and defining an internal bore therebetween; (ii) a reinforcement material, for external wrapping of the elongate tubular wall to form a reinforced pipe; (iii) a coating material, for application to an external surface of the reinforced pipe to form a containment pipe; and two or more clamps, each clamp comprising an inner clamp and an outer clamp and configured for sealingly sandwiching at least the elongate tubular wall between the inner clamp and the outer clamp; and wherein the two or more clamps are further configured for sealingly engaging a section of pipe in a pipeline to provide leak containment.

In respect of the kit-of-parts, the term "elongate tubular wall" refers only to the inner layer 22 of the elongate tubular containment wall 12 of the containment apparatus 10. When reinforcement material is applied to externally wrap the elongate tubular wall of the kit-of-parts, it is described herein as a "reinforced pipe". Thus, the reinforced pipe would comprise the inner layer 22 and the reinforcement layer 24 of the elongate tubular containment wall 12 of the containment apparatus 10. When coating material is applied to an external surface of the reinforced pipe, it is described herein as a "containment pipe". Thus, the containment pipe would comprise the inner layer 22, the reinforcement layer 24 and the outer layer 26 of the elongate tubular containment wall 12 of the containment apparatus 10. As such, the "containment pipe" is equivalent to the elongate tubular containment wall 12 of the containment apparatus 10.

As will be appreciated, the majority of components of the kit-of-parts are as described herein for the containment apparatus 10, including:
the reinforcement material which is as described herein in respect of the reinforcement layer 24;
the coating material which is as described herein in respect of the outer layer 26; and
the clamps which are described herein in respect of the first and second clamps (14 and 16) having an inner clamp 18 and an outer clamp 20, and further including the double-sided clamp embodiment 60.

The description of these components herein in respect of the containment apparatus 10 is equally applicable to the corresponding components in the kit-of-parts.

In contrast to the containment apparatus 10, the kit-of-parts provides the elongate tubular containment wall 12 as separate components that may be assembled to form the containment apparatus 10. In an embodiment, the kit-of-parts may be assembled to form the containment apparatus 10 prior to installation on a section of pipe 30, and the assembled containment apparatus 10 can then slide onto a section of pipe 30. In another embodiment, the kit-of-parts may be assembled into the containment apparatus 10 directly onto a section of pipe 30, such as depicted in FIG. 2 showing the containment apparatus 10 on a section of pipe 30. The section of pipe 30 with the assembled containment apparatus 10 thereon could then be attached to a process pipeline. In another embodiment, the kit-of-parts may be assembled into the containment apparatus 10 directly onto a section of pipe 30 contained within a process pipeline.

To achieve these and other advantageous aspects. The kit-of-parts comprises an elongate split wrap. The elongate split wrap is, in essence, the inner layer 22 of the elongate tubular containment wall 12 as described herein, with the exception that it is provided in the kit-of-parts as a sheet of material. Thus, by "elongate split wrap", it is meant to refer to a sheet of inner layer 22, whereby the sheet has a longer length than width. The sheet of material may be flat or of any curvature. In an embodiment, the sheet of material has a natural or a formed rounded curve to assist in forming an elongate tubular wall. The opposing longitudinal ends or edges of the elongate split wrap may be brought together and sealed to form the inner layer 22 of the elongate tubular containment wall 12 as described herein. Thus, as the skilled person will appreciate, the disclosure herein in respect of the inner layer 22 is equally applicable to the elongate split wrap.

In this regard, the elongate split wrap is formed of a material that is impermeable to inert gas as well as any fluid or gas that may be exposed thereto by a leak in the process pipeline. In an embodiment, the elongate split wrap is a rubber material or an equivalent thereof. The rubber material may be a natural or synthetic rubber, or combination thereof. In an embodiment, the rubber material is a urethane rubber. In another embodiment, the rubber material is a neoprene rubber or a neoprene/nylon rubber. By an "equivalent thereof", it is meant any material having similar functional properties to rubber in respect of elasticity, hardness and permeability. In an embodiment, the rubber material or equivalent thereof has a Scale A Durometer hardness of between 50° Sh and 100° Sh. The thickness of the elongate split wrap will depend on the pipe 30 diameter and pressure rating. In an embodiment, the thickness of the split wrap may be between about $\frac{1}{8}^{th}$ of an inch and about 1 inch. In a more particular embodiment, the thickness of the split wrap may be between about $\frac{3}{16}^{th}$ of an inch and about ½ of an inch.

The longitudinal ends or edges of the elongate split wrap may be sealed to form an elongate tubular wall (inner layer of tubular containment wall 12 described herein). In an embodiment, the elongate split wrap is sealed by adhering, fusing, or mechanical fastening of the ends or edges together. By "adhering", it is meant any process by which the ends or edges become joined together, at least for long enough to apply the reinforcement layer, but preferably more permanently to provide increased structural support to the final tubular structure. For example, the elongate split wrap may be sealed by adhesion using a suitable adhesive, including without limitation, rubber-based adhesives, such as nitrile elastomers; thermoplastic glues, such as cellulosics; and polyamide epoxies. By "fusing", it is meant any process by which ends or edges of the elongate split wrap are molded into each other. In an embodiment, "fusing" involves melting the material of the elongate split wrap to join the ends. In another embodiment, "fusing" involves chemically modifying the material of the split wrap, and molding together of the opposing ends. By "mechanical fastening", it is meant any product that can be used to seal together the ends or edges of the elongate split wrap. Preferably, the mechanical fastener should provide a leak-proof or a substantially leak-proof seal. Suitable mechanical fasteners are known in the art and may include, without limitation, staples, zippers, and the like. In an embodiment, any one or more of adhering, fusing, or mechanical fastening may be used alone or in combination.

In an embodiment, sealing of the ends or edges of the elongate split wrap can readily be reversed. This is an advantageous aspect of the containment apparatus 10 as disclosed herein in that if it is desired to remove the containment apparatus 10 from the pipeline, it could be done without disconnecting sections of pipe in the pipeline. Also, various components of the containment apparatus 10 could be recycled and re-used in the assembly of another containment apparatus 10, including perhaps even the elongate tubular containment wall 12 depending on how it is it is disassembled. In this regard, in an embodiment the ends or edges of the elongate split wrap are adhered to each other to form an elongate tubular wall, and the substance used to adhere the ends can be dissolved using chemicals or other substances to release the bond. In another embodiment, the fusion process could be reversed, for example by re-heating the previously sealed materials. In an embodiment, the reinforcement material and coating material may remain on the dissembled split wrap or they could be peeled away.

The kit-of-parts may further comprise one or more of the following components which are described herein in respect of the containment apparatus 10: fastening members (e.g. flange studs 48 and nuts 50), leak-detection equipment (e.g. source of inert gas and a pressure sensor 40), and drag studs 46 (embodiments where the clamps comprise drag ports 44).

Further, as previously described herein, in some embodiments, the reinforcement layer 24 may be the outer layer 26. That is, the reinforcement material and the coating material may be the same material. In such embodiments, the kit-of-parts may comprise the elongate split wrap and, for example, two or more portions of reinforcement material for multiple wrappings of the reinforcement material around the elongate split wrap. As well, it follows that, in such embodiments, the "containment pipe" may be equivalent to the "reinforced pipe".

Further components that may be useful to include in the kit-of-parts for assembly and/or operation of the pipeline-leak-containment apparatus 10 as described herein will be apparent to the skilled person and may so be included as desired.

Methods

Another aspect of the present disclosure relates to methods for providing leak containment to a section of pipe 30 in a pipeline by employing the containment apparatus 10 and/or kit-of-parts as described herein. The methods are described in greater detail below, but the skilled person will readily appreciate that variations may be made and are encompassed herein, such as without limitation any alternatives in the order of the steps.

In an embodiment, the present disclosure relates to a method for providing leak containment to a section of pipe in a pipeline, the method comprising: applying an elongate split wrap comprising two opposing ends around a section of pipe; sealing together the opposing ends of the elongate split wrap to form an elongate tubular wall surrounding the section of pipe; in any order: applying a reinforcement material to an external surface of the elongate tubular wall to form a reinforced pipe, and then externally applying a coating material onto the reinforced pipe to form a containment pipe; sealing a first end of at least the elongate tubular wall by sandwiching the first end between a first inner clamp and a first outer clamp of a first clamp, wherein the first clamp sealingly engages the section of pipe in the pipeline; and sealing a second end of at least the elongate tubular wall by sandwiching the second end between a second inner clamp and a second outer clamp of a second clamp, wherein the second clamp sealingly engages the section of pipe in the pipeline.

In respect of the methods herein, the term "elongate tubular wall" refers only to the inner layer 22 of the elongate tubular containment wall 12 of the containment apparatus 10. When reinforcement material is applied to externally wrap the elongate tubular wall, it is described in the methods herein as a "reinforced pipe". Thus, the reinforced pipe would comprise the inner layer 22 and the reinforcement layer 24 of the elongate tubular containment wall 12 of the containment apparatus 10. When coating material is applied to an external surface of the reinforced pipe, it is described in the methods herein as a "containment pipe". Thus, the containment pipe would comprise the inner layer 22, the reinforcement layer 24 and the outer layer 26 of the elongate tubular containment wall 12 of the containment apparatus 10. As such, the "containment pipe" is equivalent to the elongate tubular containment wall 12 of the containment apparatus 10. However, as previously described herein, in some embodiments, the reinforcement layer 24 may be the outer layer 26. That is, in the context of methods of the present disclosure, the reinforcement material and the coating material may be the same material. Thus, in such embodiments, the "containment pipe" may be equivalent to the "reinforced pipe".

As will be appreciated, the majority of components used in the practice of the methods are as described herein for the containment apparatus 10 and/or the kit-of-parts, including:
the elongate split wrap which is as described herein in respect of the kit-of-parts;
the reinforcement material which is as described herein in respect of the reinforcement layer 24;
the coating material which is as described herein in respect of the outer layer 26; and
the first and second clamps which are described herein as first clamp 14 and second clamp 16, each having an inner clamp 18 and an outer clamp 20, and further including the double-sided clamp embodiment 60.

The description of these components elsewhere herein in respect of the containment apparatus 10 or kit-of-parts is equally applicable to the corresponding methods.

The methods as disclosed herein involve applying an elongate split wrap comprising two opposing ends around a section of pipe 30 in a pipeline. By "applying", it is meant that the split wrap is placed around a section of pipe 30 about the longitudinal axis. Thus, the split wrap encircles the pipe 30. Applying the elongate split wrap around a section of pipe 30 may be done by any number of means, including for example and without limitation by hand, by machine, or any combination thereof. The section of pipe 30 may be of any desired length.

The step of applying the split wrap to a section of pipe 30 may be performed before, during, or after the section of pipe 30 is installed on a pipeline. In an embodiment, the split wrap is applied to a section of pipe 30 in an existing process pipeline. The process pipeline may be in operation or shut down. Advantageously, the kit-of-parts and methods herein allow for the containment apparatus 10 to be assembled on a section of pipe 30 while the process pipeline is in operation. This has the potential to save costs and reduce operational downtime. In fact, any and all of the method steps described herein can be performed before or after the section of pipe 30 is connected to a pipeline.

The methods as disclosed herein involve sealing together the opposing ends of the elongate split wrap to form an elongate tubular wall surrounding the section of pipe 30. By "sealing together", it is meant that the opposing ends of the split wrap are united to form a sealed seam. In an embodiment, the sealed seam is a leak-proof seal. In an embodiment, the sealed seam is substantially leak-proof, and the wall is later made leak-proof by the application of the reinforcement material and/or coating material. The skilled person will appreciate and understand various techniques that may be used to seal together the opposing ends of the elongate split wrap.

In an embodiment, the ends of the elongate split wrap may be sealed by being adhered to one another. This may be accomplished by any number of available adhesives, glues, laminates, or other bonding materials or chemicals. For example and without limitation, in an embodiment in which the elongate split wrap is made from a rubber material, an adhesive suitable for rubber may be used (e.g. an elastomer). Exemplary adhesives for rubber include: rubber-based adhesives, such as nitrile elastomers; thermoplastic glues, such as cellulosics; and polyamide epoxies. The skilled person would be aware of adhesives available for adhering a split wrap made from a material other than rubber.

In an embodiment, the ends of the elongate split wrap may be sealed by being fused together by a fusion sealing process. This may be accomplished by any number of available fusion techniques. In an embodiment, the fusion sealing process may comprise (i) melting the elongate split wrapping along one or both opposing ends; (ii) bringing the ends together; and (iii) allowing the material to cool to form a sealed seam. As opposed to melting, fusion may be performed by chemical modification of the material of the split wrap, and molding together of the opposing ends. In an embodiment, the fusion sealing process is performed using a chemical adhesive resin.

In an embodiment, the ends of the elongate split wrap may be sealed together by a mechanical fastener. This may be accomplished by any number of available fasteners, such as without limitation staples or zippers.

In an embodiment, the disclosed methods may include any combination of the above-described techniques for sealing together the opposing ends of the elongate split sheet.

The methods as disclosed herein involve applying a reinforcement material to an external surface of the elongate tubular wall to form a reinforced pipe. The reinforcement material may be applied to the elongate tubular wall before or after the first and/or second clamps are attached. In a preferred embodiment, both the first clamp and the second clamp are attached to opposing ends of the elongate tubular wall before the reinforcement material is applied. In an alternate embodiment, the reinforcement material is applied to the tubular wall before either of the first or second clamps are attached. In a further alternate embodiment, one of the first or second clamps is attached, the reinforcement material is applied, and then the opposing clamp is attached.

Applying the reinforcement material to the external surface may be done by any number of means, including for example and without limitation by hand, by machine or any combination thereof. Irrespective of how the reinforcement material is applied, it should be in close association with the external surface of the elongate tubular wall. By "close association", it is meant that the reinforcement material is in contact with the elongate tubular wall or is sufficiently close that the subsequently applied coating material will bond the reinforcement materials to the tubular wall. The reinforcement material may be applied as a single piece or in multiple pieces, and may completely or partially cover the external surface of the elongate tubular wall. In a preferred embodiment, the reinforcement material is not applied to the portions of the wall closest to the ends of the tubular so as to avoid potential interference with a sealing engagement to the clamps. In an embodiment, applying the reinforcement material involves wrapping the elongate tubular wall with braided stainless steel mesh and/or cable.

The methods as disclosed herein involve externally applying a coating material onto the reinforced pipe to form a containment pipe. Applying the coating material onto the reinforced pipe may be done by any number of means, including for example and without limitation by hand, by machine or any combination thereof. The specific technique for applying the coating material may depend on the type of coating material selected based on the disclosure herein. In an embodiment, the coating material is applied by spraying. Spraying may be by a hand-held spray wand or by a machine. In an embodiment, the coating material is a mixture of hemp fibers and one or more polymer resins, and it is applied by spraying. In a further embodiment, the coating material is a mixture of CNC and one or more polymer resins. In a yet further embodiment, coating material is a mixture of fibreglass and one or more polymer resins.

Application of the coating material to the reinforced pipe may completely or partially cover the reinforcing material. In an embodiment, the coating material is applied to fill the crevasses between the reinforcing material. In an embodiment, the coating material is applied to fill the crevasses between the reinforcing material, and to also provide a cover over top of the reinforcing material. In an embodiment, the coating material is applied to fill any space between the tubular wall and the reinforcing material. Any of these embodiments may be used alone or in combination and in any of these embodiments the coating material may act to bond the reinforcing material to the tubular wall. In addition, in certain embodiments it may be advantageous to apply the coating material such that it contacts inner clamp 18 at the region where it forms a wall of the interstitial space 34, as shown in FIGS. 10, 14, and 15 by feature 36.

Further, in embodiments where the reinforcement layer 24 may be the outer layer 26, the reinforcement material and the coating material may be the same material. Thus, methods of the present disclosure may comprise one or more applications of the reinforcement material to the external surface of the elongate split wrap to form the containment pipe.

The methods as disclosed herein involve sealing a first/second ends of at least the elongate tubular wall by sandwiching the first/second ends between first/second inner clamps 18 and first/second outer clamps 20. The first/second clamps (14 and 16) further sealingly engage a section of pipe 30. These steps may be performed in various different orders as would be understood having regard to the disclosure herein.

In one embodiment, a first inner clamp 18 is tightened against the pipe 30 at a desired position, an end of at least the tubular wall is set against a receiving surface on the first inner clamp 18, the first outer clamp 20 is positioned and tightened to sealingly sandwich at least the tubular wall between the first inner 18 and outer clamp 20, and the process is repeated at the opposing end.

In another embodiment, both the first and second inner clamps 18 are tightened against the pipe 30 at desired positions with each respective end of at least the tubular wall set against a receiving surface on the inner clamps 18, and then the outer clamps 20 are positioned and tightened to sealingly sandwich at least the tubular wall between the inner and outer clamps (18 and 20).

In another embodiment, a first end of the tubular wall is set against a receiving surface on the first inner clamp 18, the first outer clamp 20 is positioned and tightened to sealingly sandwich at least the tubular wall between the first inner and outer clamp (18 and 20), the process is repeated at the opposing end with the second inner and outer clamps (18 and 20), and then the clamps (14 and 16) are tightened against the pipe 30 at desired positions.

In another embodiment, a first end of the tubular wall is set against a receiving surface on the first inner clamp 18, the first outer clamp 20 is positioned and tightened to sealingly sandwich at least the tubular wall between the first inner and outer clamp (18 and 20), the first clamp 14 is tightened against the pipe 30 at a desired location, and then the process is repeated at the opposing end with the second inner and outer clamps (18 and 20).

Various alternate sequences of steps may be employed to sealingly sandwich at least the tubular wall between the inner and outer clamps (18 and 20) and sealingly engage the clamps (14 and 16) to the pipe 30 at desired positions. In any embodiment of these sequences of steps, components used may be as described herein, such as first clamp 14, second clamp 16, inner clamp 18, and outer clamp 20. In a particular embodiment, the inner and outer clamps (18 and 20) are split clamps as described herein. In a preferred embodiment, only the inner layer 22 of tubular containment wall 12 is sandwiched in the clamps (14 and 16). However, in alternate embodiments, for example, where at least the outer clamps 20 are lined with a pliable material (e.g. rubber-lined), the portion of the tubular containment wall 12 sandwiched within the clamps (14 and 16) may comprise some reinforcing material and/or coating material.

In an embodiment, the method is performed in the following order: (i) applying the elongate split wrap around the section of pipe in the pipeline; (ii) sealing together the opposing ends of the elongate split wrap to form the elongate tubular wall surrounding the section of pipe; (iii) applying the reinforcement material to the external surface of the elongate tubular wall to form the reinforced pipe; (iv) sealing the first end of the elongate tubular wall by sandwiching the first end between the first inner clamp and the first outer clamp of the first clamp; (v) sealing the second end of the elongate tubular wall by sandwiching the second end between the second inner clamp and the second outer clamp of the second clamp; and (v) externally applying the coating material onto the reinforced pipe to form the containment pipe.

In an embodiment, the method is performed in the following order: (i) applying the elongate split wrap around the section of pipe in the pipeline; (ii) sealing together the opposing ends of the elongate split wrap to form the elongate tubular wall surrounding the section of pipe; (iii) sealing the first end of the elongate tubular wall by sandwiching the first end between the first inner clamp and the first outer clamp of the first clamp; (iv) sealing the second end of the elongate tubular wall by sandwiching the second end between the second inner clamp and the second outer clamp of the second clamp; (v) applying the reinforcement material to the external surface of the elongate tubular wall to form the reinforced pipe; and (vi) externally applying the coating material onto the reinforced pipe to form the containment pipe.

In an embodiment, the method is performed in the following order: (i) applying the elongate split wrap around the section of pipe in the pipeline; (ii) sealing together the opposing ends of the elongate split wrap to form the elongate tubular wall surrounding the section of pipe; (iii) applying the reinforcement material to the external surface of the elongate tubular wall to form the reinforced pipe; (iv) externally applying the coating material onto the reinforced pipe to form the containment pipe; (v) sealing the first end of at least the elongate tubular wall by sandwiching the first end between the first inner clamp and the first outer clamp of the first clamp; and (vi) sealing the second end of at least the elongate tubular wall by sandwiching the second end between the second inner clamp and the second outer clamp of the second clamp.

The containment apparatus 10 as disclosed herein is capable of providing leak detection. As described elsewhere herein, the first and second clamps (14 and 16) in some embodiments include ports 38 that provide fluid communication from outside the containment apparatus 10 into the interstitial space 34.

Thus, in an embodiment, the methods may further comprise interconnecting leak-detection equipment to one or more ports 38 in the first and/or second clamps (14 and 16). Exemplary embodiments of the leak-detection equipment are described elsewhere herein. In an embodiment, the leak-detection equipment includes a source of inert gas and a pressure sensor 40. In a preferred embodiment, the ports 38 are threaded near the external surface of the inner clamp 18 for securing the leak-detection equipment thereto.

The leak detection may be used for monitoring for a leak in the pipeline. Exemplary steps comprise providing pressurized inert gas to the interstitial space 34 at a defined pressure and monitoring for a change in the defined pressure that indicates a breach or leak in the section of pipe 30. By "defined pressure", it is meant any pressure that is other than the operating pressure of the pipeline.

The source of inert gas may be supplied from any source. In an embodiment, the inert gas is supplied from tanks that are interconnected to the containment apparatus 10 by a hose. The inert gas is pumped into the interstitial space 34 to create a pressurized area. The pressurized area should be of a different pressure than the operating pressure in the pipeline.

In an embodiment, the inert gas is pumped into the pressurized area to a pressure that is less than the operating pressure in the pipeline. For example, in an embodiment, the pressurized area may be 10% to 25% of the operating pressure in the pipeline. In such embodiments, an increase in pressure in the interstitial space 34 would be indicative of a leak in the pipeline.

In another embodiment, the inert gas is pumped into the pressurized area to a pressure that is greater than the operating pressure of the pipeline. For example, in an embodiment, the pressurized area may be 25% to 75% greater than the operating pressure. In such embodiments, a decrease in pressure in the interstitial space 34 would be indicative of a leak in the pipeline.

After the interstitial space is pressurized with the inert gas, the source of the inert gas may be disconnected. The port 38 may be sealed with a plug, such as an NPT plug 42. Alternatively, the port 38 may be connected to the pressure sensor 40. Embodiments of pressure sensors 40 are described elsewhere herein. The pressure sensor 40 may be connected to a port 38 at one end of the containment apparatus 10, or may be connected to ports 38 at both ends of the containment apparatus 10. The pressure sensor 40 provides an indicator of the pressure within the interstitial space (e.g. pressure gauge) or is connected to a visual or audible warning signal or alarm which is activated in the event of a change in pressure, indicating a leak.

In a further embodiment, the methods herein comprise engaging a drag stud 46 against the pipe 30 to lock the clamp in place and prevent movement along the pipeline. In embodiments in which the containment apparatus 10 includes drag studs 46, the drag studs 46 are housed in threaded drag ports 44 in the inner clamp 18. The drag studs 46 may be screwed into the drag ports 44 until they contact the pipe 30 with sufficient force to provide a locking engagement. In a preferred embodiment, each clamp (14 and 16) includes multiple drag studs 46 that are engaged against the pipe 30 with near equivalent force. In a preferred embodiment, the drag studs 46 are spaced equidistant around the inner clamp 18 to provide a uniform locking engagement around the circumference.

Preferably, should a leak be detected in a section of pipe 30, the section of pipe 30 being contained will be equipped with emergency shut-down valves located at each end of the process piping. In an embodiment, the leak-detection equipment is in communication with the controls for the emergency shut-down valves. In the event that there is a pressure change in the interstitial space 34 indicating a leak or breach in the pipeline, the leak-detection equipment can be configured to trigger the emergency shut-down valves to close, thereby stopping any further flow through the pipeline.

Although the foregoing has been described in some detail by way of illustration and example for purposes of clarity of understanding, it is readily apparent to those of ordinary skill in the art in light of the teachings of the present disclosure that certain changes and modifications may be made thereto without departing from the spirit or scope of the appended claims.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present subject matter is not entitled to antedate such publication by virtue of prior invention.

It must be noted that as used in this specification and the appended claims, the singular forms "a", "an", and "the" include plural reference unless the context clearly dictates otherwise. Unless defined otherwise all technical terms used herein have the same meaning as commonly understood to one of ordinary skill in the art to which the present disclosure belongs.

The phrase "and/or", as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to encompass the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

As used herein, whether in the specification or the appended claims, the transitional terms "comprising", "including", "having", "containing", "involving", and the like are to be understood as being inclusive or open-ended (i.e., to mean including but not limited to), and they do not exclude unrecited elements, materials or method steps. Only the transitional phrases "consisting of" and "consisting essentially of", respectively, are closed or semi-closed transitional phrases with respect to claims and exemplary embodiments herein. The transitional phrase "consisting of" excludes any element, step, or ingredient which is not specifically recited. The transitional phrase "consisting essentially of" limits the scope to the specified elements, materials or steps and to those that do not materially affect the basic characteristic(s) of the subject matter disclosed and/or claimed herein.

As used herein, whether in the specification or the appended claims, the terms "about" or "approximately" refer to within about 25%, preferably within about 20%, preferably within about 15%, preferably within about 10%, preferably within about 5% of a given value or range. It is understood that such a variation is always included in any given value provided herein, whether or not it is specifically referred to.

The invention claimed is:

1. A pipeline-leak-containment apparatus comprising:
   an elongate tubular containment wall comprising a first end opposite a second end and defining an internal bore therebetween, wherein the elongate tubular containment wall comprises an inner layer, a reinforcement layer and an outer layer;
   a first clamp comprising a first inner clamp and a first outer clamp, wherein at least the inner layer at the first end of the elongate tubular containment wall is sealingly sandwiched between the first inner clamp and first outer clamp; and
   a second clamp comprising a second inner clamp and a second outer clamp, wherein at least the inner layer at the second end of the elongate tubular containment wall is sealingly sandwiched between the second inner clamp and the second outer clamp;
   wherein, when the pipeline-leak-containment apparatus is positioned around a section of pipe in a pipeline, the first and second inner clamps sealingly engage the pipe to form a sealed interstitial space between the elongate tubular containment wall and the pipe.

2. The pipeline-leak-containment apparatus of claim 1, wherein the inner layer is a rubber material or an equivalent thereof.

3. The pipeline-leak-containment apparatus of claim 1, wherein the reinforcement layer comprises a metal or metallic alloy.

4. The pipeline-leak-containment apparatus of claim 3, wherein the reinforcement layer comprises braided stainless steel mesh or cable.

5. The pipeline-leak-containment apparatus of claim 1, wherein the outer layer is comprised of hemp fibers mixed with one or more polymer resins.

6. The pipeline-leak-containment apparatus of claim 1, wherein the first outer clamp and the second outer clamp are split clamps that sealingly engage the pipe upon tightening of fastening members.

7. The pipeline-leak-containment apparatus of claim 1, wherein the first inner clamp and the second inner clamp are split clamps that sealingly engage the inner layer of the elongate tubular containment wall upon tightening of fastening members.

8. The pipeline-leak-containment apparatus of claim 6, wherein the fastening members are flange studs affixed on each end with a nut.

9. The pipeline-leak-containment apparatus of claim 6, wherein the split clamps are rubber-lined, metal or metallic alloy split clamps.

10. The pipeline-leak-containment apparatus of claim 1, wherein one or both of the first clamp and second clamp comprise ports for the connection of leak-detection equipment, the ports being in fluid communication with the interstitial space.

11. The pipeline-leak-containment apparatus of claim 10, wherein the leak-detection equipment comprises a source of inert gas and a pressure sensor, wherein pressurized inert gas is applied to the interstitial space to form a pressurized area, the pressurized area indicating a breach or leak in the pipeline when a change in pressure is detected by the pressure sensor.

12. The pipeline-leak-containment apparatus of claim 11, wherein the pressurized area is at a pressure of between about 10% and about 25% of a pipeline operating pressure.

13. The pipeline-leak-containment apparatus of claim 1, wherein one or both of the first inner clamp and second inner clamp comprise a threaded drag port housing a drag stud that engageably locks the clamp in position on the pipe preventing movement of the pipeline-leak-containment apparatus along the pipeline.

14. A kit-of-parts for providing leak containment to a pipeline, the kit-of-parts comprising:
   an elongate split wrap having opposing ends, that when sealed together at the opposing ends forms an elongate tubular wall comprising a first end opposite a second end and defining an internal bore therebetween;
   a reinforcement material, for external wrapping of the elongate tubular wall to form a reinforced pipe;
   a coating material, for application to an external surface of the reinforced pipe to form a containment pipe; and
   two or more clamps, each clamp comprising an inner clamp and an outer clamp and configured for sealingly sandwiching at least the elongate tubular wall between the inner clamp and the outer clamp; and
   wherein the two or more clamps are further configured for sealingly engaging a section of pipe in a pipeline to provide leak containment.

15. The kit-of-parts of claim 14, wherein:
   the elongate split wrap is a rubber material or an equivalent thereof;
   the reinforcement material is a metal or metallic alloy; and
   the coating material is a mixture of hemp fibers and one or more polymer resins.

16. The kit-of-parts of claim 14, wherein the outer clamp is an outer split clamp with fastening members and the inner clamp is an inner split clamp with fastening members.

17. The kit-of-parts of claim 16, wherein one or both of the inner and outer split clamps are rubber-lined, metal or metallic split clamps.

18. A method for providing leak containment to a section of pipe in a pipeline, the method comprising:
   applying an elongate split wrap comprising two opposing ends around a section of pipe;
   sealing together the opposing ends of the elongate split wrap to form an elongate tubular wall surrounding the section of pipe;
   in any order:
      applying a reinforcement material to an external surface of the elongate tubular wall to form a reinforced pipe, and then externally applying a coating material onto the reinforced pipe to form a containment pipe;
      sealing a first end of at least the elongate tubular wall by sandwiching the first end between a first inner clamp and a first outer clamp of a first clamp, wherein the first clamp sealingly engages the section of pipe in the pipeline; and
      sealing a second end of at least the elongate tubular wall by sandwiching the second end between a second inner clamp and a second outer clamp of a second clamp, wherein the second clamp sealingly engages the section of pipe in the pipeline.

19. The method of claim 18, wherein the steps are performed in the following order:
   applying the elongate split wrap around the section of pipe in the pipeline;
   sealing together the opposing ends of the elongate split wrap to form the elongate tubular wall surrounding the section of pipe;
   applying the reinforcement material to the external surface of the elongate tubular wall to form the reinforced pipe;
   sealing the first end of the elongate tubular wall by sandwiching the first end between the first inner clamp and the first outer clamp of the first clamp;
   sealing the second end of the elongate tubular wall by sandwiching the second end between the second inner clamp and the second outer clamp of the second clamp; and
   externally applying the coating material onto the reinforced pipe to form the containment pipe.

20. The method of claim 18, wherein the steps are performed in the following order:
   applying the elongate split wrap around the section of pipe in the pipeline;
   sealing together the opposing ends of the elongate split wrap to form the elongate tubular wall surrounding the section of pipe;
   sealing the first end of the elongate tubular wall by sandwiching the first end between the first inner clamp and the first outer clamp of the first clamp;
   sealing the second end of the elongate tubular wall by sandwiching the second end between the second inner clamp and the second outer clamp of the second clamp;
   applying the reinforcement material to the external surface of the elongate tubular wall to form the reinforced pipe; and
   externally applying the coating material onto the reinforced pipe to form the containment pipe.

21. The method of claim 18, wherein the steps are performed in the following order:
   applying the elongate split wrap around the section of pipe in the pipeline;
   sealing together the opposing ends of the elongate split wrap to form the elongate tubular wall surrounding the section of pipe;
   applying the reinforcement material to the external surface of the elongate tubular wall to form the reinforced pipe;
   externally applying the coating material onto the reinforced pipe to form the containment pipe;
   sealing the first end of at least the elongate tubular wall by sandwiching the first end between the first inner clamp and the first outer clamp of the first clamp; and
   sealing the second end of at least the elongate tubular wall by sandwiching the second end between the second inner clamp and the second outer clamp of the second clamp.

22. The method of claim 18, further comprising interconnecting leak-detection equipment to a port in one or both of the first clamp and second clamp, wherein the leak-detection equipment is in fluid communication with an interstitial space between the containment pipe and the section of pipe in the pipeline.

23. The method of claim 18, further comprising engaging a drag stud housed in one or both of the first inner clamp and second inner clamp against the section of pipe to lock the clamp in place and prevent movement along the pipeline.

* * * * *